United States Patent
Kato et al.

(10) Patent No.: US 11,384,192 B2
(45) Date of Patent: Jul. 12, 2022

(54) MODIFIED HYDROGENATED PRODUCT, METHOD FOR PRODUCING SAME, RESIN COMPOSITION, AND VARIOUS USES THEREOF

(71) Applicant: KURARAY CO., LTD., Kurashiki (JP)

(72) Inventors: Masahiro Kato, Kamisu (JP); Yasushi Senda, Kamisu (JP); Yoshihiro Aoki, Kamisu (JP); Nobuhiro Oya, Tsukuba (JP); Hideaki Suzuki, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/059,023

(22) PCT Filed: May 22, 2019

(86) PCT No.: PCT/JP2019/020317
§ 371 (c)(1),
(2) Date: Nov. 25, 2020

(87) PCT Pub. No.: WO2019/230527
PCT Pub. Date: Dec. 5, 2019

(65) Prior Publication Data
US 2021/0324130 A1    Oct. 21, 2021

(30) Foreign Application Priority Data

May 31, 2018 (JP) .............................. JP2018-105644
Nov. 21, 2018 (JP) .............................. JP2018-218517

(51) Int. Cl.
*C08F 297/04* (2006.01)
*C08F 8/04* (2006.01)
*C08L 53/02* (2006.01)

(52) U.S. Cl.
CPC ............ *C08F 297/046* (2013.01); *C08F 8/04* (2013.01); *C08L 53/025* (2013.01); *C08L 2207/04* (2013.01)

(58) Field of Classification Search
CPC ........................ C08F 297/056; C08F 297/046; C08F 297/04; C08F 297/048; C08F 8/04; C08L 53/025
See application file for complete search history.

(56) References Cited

U.S. PATENT DOCUMENTS

| 2012/0204940 A1 | 8/2012 | Asanuma et al. |
| 2015/0197588 A1 | 7/2015 | Uehara et al. |
| 2018/0030195 A1 | 2/2018 | Oshita et al. |

FOREIGN PATENT DOCUMENTS

| JP | 5-194821 A | 8/1993 |
| JP | 5-202287 A | 8/1993 |
| JP | 2000-94588 A | 4/2000 |
| WO | WO 2011/016494 A1 | 2/2011 |
| WO | WO 2013/183570 A1 | 12/2013 |
| WO | WO 2016/136760 A1 | 9/2016 |
| WO | WO 2017/150166 | 9/2017 |
| WO | WO 2017/199983 A1 | 11/2017 |

OTHER PUBLICATIONS

International Search Report dated Jul. 9, 2019 in PCT/JP2019/020317 filed May 22, 2019, 4 pages.
Extended European Search Report dated Feb. 22, 2022, in corresponding European Patent Application No. 19811482.9.

*Primary Examiner* — Mark S Kaucher
(74) *Attorney, Agent, or Firm* — Oblon, McClelland, Maier & Neustadt, L.L.P.

(57) ABSTRACT

The present invention relates to a modified hydrogenated product of a block copolymer having a polymer block (A) containing a structural unit derived from an aromatic vinyl compound, and a polymer block (B) containing a structural unit derived from a conjugated diene compound, a method of producing the modified hydrogenated product, and a resin composition containing the modified hydrogenated product. The modified hydrogenated product has one or more functional groups selected from an alkoxysilyl group, a carboxy group, an amino group, a hydroxy group, an epoxy group, and an acid anhydride-derived group, and satisfies the following conditions.
Condition (1): after stay at 330° C. for 30 min under nitrogen atmosphere, a weight change rate is −5.5% or more.
Condition (2): the peak top intensity of tan δ measured in accordance with JIS K7244-10 (2005), under conditions including a strain amount of 0.1%, a frequency of 1 Hz, a measurement temperature of −70 to 120° C., and a temperature rise rate of 3° C./min, is 1.0 or more.

25 Claims, No Drawings

MODIFIED HYDROGENATED PRODUCT, METHOD FOR PRODUCING SAME, RESIN COMPOSITION, AND VARIOUS USES THEREOF

TECHNICAL FIELD

The present invention relates to a modified hydrogenated product and a method for producing the same, a resin composition containing the modified hydrogenated product, and various uses thereof.

BACKGROUND ART

In some cases, a block copolymer having a polymer block containing a structural unit derived from an aromatic vinyl compound and a polymer block containing a structural unit derived from a conjugated diene compound, especially, a hydrogenated product thereof, in which the structural unit derived from the conjugated diene compound has vinyl bond units (for example, 1,2-bond units and 3,4-bond units), is used as a damping material, and then, it is generally known that tan δ measured in accordance with JIS K7244-10 becomes an indicator of vibration damping.

In addition, for the purpose of providing a damping material excellent in each of physical properties such as mechanical strength, heat resistance, and oil resistance, as well as vibration damping, a resin composition containing the block copolymer or the hydrogenated product thereof and a resin is being developed. For example, a technique is disclosed in relation to a resin composition having an excellent vibration damping performance, from which a damping material with improved impact resistance may be obtained (for example, see Patent Literatures 1 and 2). Patent Literature 1 describes a resin composition that contains a thermoplastic resin having a polar group, and a modified block copolymer or a hydrogenated product thereof, to which a functional group having affinity or reactivity with the polar group is added at a specific ratio. Also, Patent Literature 2 describes a resin composition that contains a thermoplastic resin having a polar group, a block copolymer or a hydrogenated product thereof, and a modified polymer in which a polymer having affinity with the block copolymer or the hydrogenated product thereof is bonded to a functional group having affinity or reactivity with the polar group.

CITATION LIST

Patent Literature

PTL 1: JP 5-194821 A
PTL 2: JP 5-202287 A

SUMMARY OF INVENTION

Technical Problem

In addition, it is required that a resin composition have an excellent vibration damping property and be excellent in moldability and mechanical properties such as a tensile characteristic or a bending characteristic so as to be applied to various uses.

Both Patent Literatures 1 and 2 disclose a technique of improving the compatibility between a thermoplastic resin having a polar group and a block copolymer or a hydrogenated product thereof, but there is no description on the mechanical properties and the moldability. In addition, it cannot be said that the hydrogenated product of the modified block copolymer described in Patent Literature 1 has a sufficiently excellent thermal stability, and it is difficult to simultaneously exhibit excellence in vibration damping, mechanical properties, and moldability.

Therefore, the present invention provides a modified hydrogenated product excellent in vibration damping and thermal stability, and a method of producing the modified hydrogenated product.

In addition, the present invention provides a resin composition that is excellent in a vibration damping property, and also excellent in mechanical properties and moldability.

Solution to Problem

The present inventors conducted intensive studies to solve the above problems, and, as a result, have come up with the following present invention, and have found that the corresponding problems can be solved.

That is, the present invention is as follows.

[1] A modified hydrogenated product of a block copolymer having a polymer block (A) containing a structural unit derived from an aromatic vinyl compound, and a polymer block (B) containing a structural unit derived from a conjugated diene compound, in which the modified hydrogenated product has one or more functional groups selected from an alkoxysilyl group, a carboxy group, an amino group, a hydroxy group, an epoxy group, and an acid anhydride-derived group, and satisfies following conditions:

Condition (1): after stay at 330° C. for 30 min under nitrogen atmosphere, a weight change rate is −5.5% or more, and Condition (2): a peak top intensity of tan δ measured in accordance with JIS K7244-10 (2005), under conditions including a strain amount of 0.1%, a frequency of 1 Hz, a measurement temperature of −70 to 120° C., and a temperature rise rate of 3° C./min, is 1.0 or more.

[2] A method of producing the modified hydrogenated product, including carrying out a polymerization reaction by using at least an aromatic vinyl compound and a conjugated diene compound as monomers to obtain a block copolymer having a polymer block (A) containing a structural unit derived from the aromatic vinyl compound, and a polymer block (B) containing a structural unit derived from the conjugated diene compound.

[3] A resin composition containing the modified hydrogenated product.

[4] A pellet, a bale, a molded body, a damping material, a sound insulating material, a dam rubber, a sole material, a flooring material, an adhesive or a sticking agent, a laminate, and an automobile part, which use the modified hydrogenated product or the resin composition.

Advantageous Effects of Invention

According to the present invention, it is possible to provide a modified hydrogenated product having an excellent vibration damping property and a thermal stability, and a method of producing the modified hydrogenated product.

In addition, according to the present invention, it is possible to provide a resin composition that contains the modified hydrogenated product, and has an excellent vibration damping property, and is also excellent in mechanical properties and moldability.

DESCRIPTION OF EMBODIMENTS

<<Modified Hydrogenated Product>>

There is a characteristic in that a modified hydrogenated product of the present invention is a modified hydrogenated product of a block copolymer having a polymer block (A) containing a structural unit derived from an aromatic vinyl compound and a polymer block (B) containing a structural unit derived from a conjugated diene compound, has one or more functional groups selected from an alkoxysilyl group, a carboxy group, an amino group, a hydroxy group, an epoxy group, and an acid anhydride-derived group, and satisfies the following conditions.

Condition (1): after stay at 330° C. for 30 min under nitrogen atmosphere, a weight change rate is −5.5% or more.

Condition (2): the peak top intensity of tan δ measured in accordance with JIS K7244-10 (2005), under conditions including a strain amount of 0.1%, a frequency of 1 Hz, a measurement temperature of −70 to 120° C., and a temperature rise rate of 3° C./min, is 1.0 or more.

The modified hydrogenated product of the present invention may exhibit an excellent vibration damping property and a thermal stability by having the polymer blocks (A) and (B) and the functional groups suitable for a damping material, and satisfying the conditions (1) and (2).

The polymer blocks (A) and (B) may preferably contribute to improvement of a glass transition temperature and a peak top intensity of tan δ, and the hydrogenation of the block copolymer may contribute to exhibition of a thermal stability. Preferably, a vibration damping property may be further improved by optimizing a ratio of structural units of the polymer blocks (A) and (B) or various conditions of a method of producing the block copolymer, and also since the modified hydrogenated product may be obtained through hydrogenation at a higher hydrogenation rate, an excellent thermal stability can be obtained.

In addition, since the modified hydrogenated product of the present invention has the functional groups, compatibility with various resins is good. Therefore, a resin composition containing the modified hydrogenated product of the present invention and a resin is good in compatibility, and thus the excellent vibration damping property included in the modified hydrogenated product is also kept in the resin composition. Further, since the modified hydrogenated product is excellent in the thermal stability, and is well compatible with the resin, the resin composition is less likely to cause a defect such as surface peeling even in various molding processes and is excellent in moldability. In addition, the resin composition also can exhibit excellent effects on mechanical properties such as a tensile characteristic and a bending characteristic from the compatibility and the thermal stability. In addition, the modified hydrogenated product of the present invention preferably has the functional groups in the side chain. In this case, it is possible to exhibit an excellent vibration damping property in a wide range of temperatures by controlling the glass transition temperature. As described above, the resin composition of the present invention may exhibit excellence simultaneously in vibration damping, mechanical properties, and moldability.

[Block Copolymer]

The block copolymer has the polymer block (A) containing a structural unit derived from an aromatic vinyl compound, and the polymer block (B) containing a structural unit derived from a conjugated diene compound. Hereinafter, the polymer block (A) and the polymer block (B) will be described.

(Polymer Block (A))

<Aromatic Vinyl Compound>

The polymer block (A) constituting the block copolymer has a structural unit derived from an aromatic vinyl compound (hereinafter, referred to as an "aromatic vinyl compound unit") from the viewpoint of vibration damping and mechanical properties.

The content of the aromatic vinyl compound unit in the polymer block (A) is preferably more than 70 mol %. Among them, from the viewpoint of vibration damping and mechanical properties, the content of the aromatic vinyl compound unit in the polymer block (A) is more preferably 80 mol % or more, further preferably 90 mol % or more, still further preferably 95 mol % or more, particularly preferably substantially 100 mol %.

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, 8-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, a styrene derivative substituted with a silyl group, indene, vinyl naphthalene, and N-vinyl carbazole. These aromatic vinyl compounds may be used alone or two or more thereof may be used.

Among them, from the viewpoint of a production cost and a physical property balance, as the aromatic vinyl compound, preferably, a styrene-based compound, more preferably, styrene, α-methylstyrene, p-methylstyrene, or a mixture thereof, further preferably, styrene is contained.

<Monomer Other than Aromatic Vinyl Compound>

In addition, as long as the object and effects of the present invention are not disturbed, the polymer block (A) may contain a structural unit derived from an unsaturated monomer other than the aromatic vinyl compound (hereinafter, referred to as "another unsaturated monomer unit"), generally at a ratio of 30 mol % or less in the polymer block (A).

Among them, from the viewpoint of mechanical properties, the content of the other unsaturated monomer unit in the polymer block (A) is preferably less than 20 mol %, further preferably less than 10 mol %, still further preferably less than 5 mol %, particularly preferably 0 mol %.

Examples of the other unsaturated monomer include at least one selected from the group including butadiene, isoprene, 2,3-dimethylbutadiene, 1,3-pentadiene, 1 3-hexadiene, isobutylene, methyl methacrylate, methyl vinyl ether, β-pinene, 8,9-p-mentene, dipentene, methylenenorbornene, and 2-methylenetetrahydrofuran.

The bonding form in the case where the polymer block (A) contains the other unsaturated monomer unit is not particularly limited, and may be any one of random and tapered forms.

In addition, the block copolymer may have at least one polymer block (A). When the block copolymer has two or more polymer blocks (A), these polymer blocks (A) may be the same or different.

In this specification, "polymer blocks are different" means that they are different in at least one of a monomer unit constituting a polymer block, a weight average molecular weight, a stereoregularity, and also in a ratio of each monomer unit and a copolymerization form (random, gradient, or block) in a case where a plurality of monomer units is included.

<Weight Average Molecular Weight of Polymer Block (A)>

The weight average molecular weight (Mw) of the polymer block (A) is not particularly limited, but the weight average molecular weight of at least one polymer block (A) among the polymer blocks (A) included in the block copolymer is preferably 3,000 to 60,000, more preferably 4,000 to 50,000, further preferably 4,000 to 40,0000, still further preferably 4,000 to 30,000. When the block copolymer has at least one polymer block (A) having a weight average molecular weight within the above-mentioned range, the mechanical strength is further improved, and the moldability is easily enhanced.

In addition, in this specification, the weight average molecular weight is a weight average molecular weight (in terms of standard polystyrene) obtained by gel permeation chromatography (GPC) measurement. The detailed measurement method may follow the method described in Examples. The weight average molecular weight of each polymer block (A) included in the block copolymer may be obtained by measuring a sampled liquid each time polymerization of each polymer block is ended in a production process. In addition, for example, in the case of a triblock copolymer having an A1-B-A2 structure, weight average molecular weights of the first polymer block A1 and the polymer block B are obtained by the above-mentioned method, and by subtracting these from the weight average molecular weight of the block copolymer, the weight average molecular weight of the second polymer block A2 may be obtained. In addition, in another method, in the case of a triblock copolymer having an A1-B-A2 structure, the total weight average molecular weight of the polymer blocks (A) is calculated from the weight average molecular weight of the block copolymer and the total content of the polymer blocks (A) confirmed by $^1$H-NMR measurement, and the weight average molecular weight of the deactivated first polymer block A1 is calculated by GPC measurement, and then, by subtracting this, the weight average molecular weight of the second polymer block A2 may be obtained.

<Content of Polymer Block (A)>

The content of the polymer block (A) in the block copolymer is preferably 70% by mass or less, more preferably 65% by mass or less, further preferably 40% by mass or less, still further preferably 25% by mass or less, still further preferably 20% by mass or less, still further preferably 15% by mass or less. When the content of the polymer block (A) is 70% by mass or less, the modified hydrogenated product or the resin composition containing this may have an appropriate flexibility and a more excellent vibration damping property, in which the peak top intensity of tan δ is not reduced. In addition, the content of the polymer block (A) in the block copolymer is preferably 1% by mass or more, more preferably 3% by mass or more, further preferably 6% by mass or more. When the content of the polymer block (A) is 1% by mass or more, the modified hydrogenated product or the resin composition containing this may have mechanical properties and moldability suitable for various uses.

The content of the polymer block (A) in the block copolymer is a value obtained by $^1$H-NMR measurement, and more specifically, a value measured according to the method described in Examples.

(Polymer Block (B))

<Conjugated Diene Compound>

The polymer block (B) constituting the block copolymer has a structural unit derived from a conjugated diene compound (hereinafter, referred to as a "conjugated diene compound unit") from the viewpoint of vibration damping and thermal stability.

The content of the conjugated diene compound unit in the polymer block (B) is preferably 30 mol % or more. Among them, from the viewpoint of vibration damping and thermal stability, the content of the conjugated diene compound unit in the polymer block (B) is more preferably 50 mol % or more, further preferably 65 mol % or more, still further preferably 80 mol % or more, still further preferably 90 mol % or more, particularly preferably substantially 100 mol %.

The "conjugated diene compound unit" may be a structural unit derived from one type of conjugated diene compound, or a structural unit derived from two or more types of conjugated diene compounds.

In the present invention, the conjugated diene compound preferably contains isoprene, or isoprene and butadiene from the viewpoint of achieving both an excellent vibration damping property and a thermal stability. In addition, as the conjugated diene compound, as described below, conjugated diene compounds other than isoprene and butadiene may be contained. Meanwhile, from the viewpoint of easily exhibiting an excellent vibration damping property and a thermal stability, the content of isoprene in the conjugated diene compound is preferably 20% by mass or more, more preferably 40% by mass or more, further preferably 45% by mass or more, still further preferably 55% by mass or more, still further preferably 75% by mass or more, particularly preferably 100% by mass. That is, it is particularly preferable to use isoprene as the conjugated diene compound.

In addition, when the conjugated diene compound is a mixture of butadiene and isoprene, the mixing ratio thereof [isoprene/butadiene] (mass ratio) is not particularly limited as long as the effect of the present invention is not impaired, but is preferably 5/95 to 95/5, more preferably 10/90 to 90/10, further preferably 40/60 to 70/30, particularly preferably 45/55 to 65/35. When expressed in a molar ratio, the mixing ratio [isoprene/butadiene] is preferably 5/95 to 95/5, more preferably 10/90 to 90/10, further preferably 40/60 to 70/30, particularly preferably 45/55 to 55/45.

Examples of the conjugated diene compound include, in addition to the isoprene and butadiene, hexadiene, 2,3-dimethyl-1,3-butadiene, 1,3-pentadiene, and myrcene. The conjugated diene compound may be used alone or two or more thereof may be used.

<Monomer Other than Conjugated Diene Compound>

In addition, as long as the object and effects of the present invention are not disturbed, the polymer block (B) may contain a structural unit derived from a polymerizable monomer other than the conjugated diene compound. In this case, in the polymer block (B), the content of the structural unit derived from the polymerizable monomer other than the conjugated diene compound is preferably less than 70 mol %, more preferably less than 50 mol %, further preferably less than 35 mol %, particularly preferably less than 20 mol %. The lower limit value of the content of the structural unit derived from the polymerizable monomer other than the conjugated diene compound is not particularly limited, but may be 0 mol %, may be 5 mol %, or may be 10 mol %.

Examples of the other polymerizable monomer preferably include at least one compound selected from the group consisting of aromatic vinyl compounds, such as styrene, α-methylstyrene, o-methylstyrene, m-methylstyrene, p-methylstyrene, p-t-butylstyrene, 2,4-dimethylstyrene, vinyl naphthalene and vinyl anthracene, and methyl methacrylate, and methylvinyl ether, N-vinyl carbazole, β-pinene, 8,9-p-mentene, dipentene, methylenenorbornene, 2-methylenetetrahydrofuran, 1,3-cyclopentadiene, 1,3-cyclohexadiene, 1,3-cycloheptadiene, and 1,3-cyclooctadiene. Among them, styrene, α-methylstyrene, and p-methylstyrene are preferable, and styrene is more preferable.

In addition, the block copolymer may have at least one polymer block (B). When the block copolymer has two or more polymer blocks (B), these polymer blocks (B) may be the same or different. When the polymer block (B) has two or more types of structural units, the bonding form thereof may be random-, tapered-, completely alternative-, partial block forms, a block, or a combination of two or more types thereof.

<Amount of Vinyl Bonds>

As long as the object and effects of the present invention are not impaired, the bonding form of the conjugated diene compound is not particularly limited. For example, when the structural unit constituting the polymer block (B) is any one of an isoprene unit, and a mixture unit of isoprene and butadiene, as for the bonding form of each of isoprene and butadiene, a vinyl bond (a 1,2-bond, and a 1,4-bond in the case of butadiene, and a 1,2-bond, a 3,4-bond, and a 1,4-bond in the case of isoprene) may be adopted. Only one type of these bonding forms may be present, or two or more types may be present.

In the block copolymer, the total content of the 3,4-bond units and the 1,2-bond units in the polymer block (B) (that is, an amount of vinyl bonds) is preferably 5 mol % or more, more preferably 50 mol % or more, further preferably 55 mol % or more, still further preferably 60 mol % or more, still further preferably 65 mol % or more, still further preferably 70 mol % or more, still further preferably 75 mol % or more. The case where the amount of vinyl bonds in the polymer block (B) is 5 mol % or more can contribute to exhibition of vibration damping, and further, at 50 mol % or more, the vibration damping property becomes better, and the vibration damping property tends to be improved as the amount of vinyl bonds increases.

In addition, the amount of vinyl bonds in the polymer block (B) may be 95 mol % or less, may be 92 mol % or less, or may be 90 mol % or less. Here, the amount of vinyl bonds is a value calculated by $^1$H-NMR measurement according to the method described in Examples.

<Content of Structural Unit Including Aliphatic Skeleton (X) in Main Chain, in Polymer Block (B)>

The polymer block (B) may have a structural unit that is derived from the conjugated diene compound and includes at least one aliphatic skeleton (X) represented by the following formula (X), in a main chain.

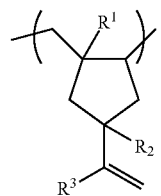

(X)

In the formula (X), each of $R^1$ to $R^3$ independently represents a hydrogen atom or a hydrocarbon group having 1 to 11 carbon atoms, and the plurality of $R^1$ to $R^3$ may be the same or different.

The content of the aliphatic skeleton (X) in the polymer block (B) is preferably 1 mol % or more, more preferably 1.1 mol % or more, further preferably 1.4 mol % or more, still further preferably 1.8 mol % or more, still further preferably 4 mol % or more, still further preferably 10 mol % or more, particularly preferably 13 mol % or more. In addition, the upper limit of the content of the aliphatic skeleton (X) in the polymer block (B) is not particularly limited as long as the effect of the present invention is not impaired, but is preferably 40 mol % or less, and may be 30 mol % or less, may be 20 mol % or less, or may be 18 mol % or less from the viewpoint of productivity.

The content of the aliphatic skeleton (X) included in the block copolymer or the hydrogenated product thereof is a value that is obtained from an integrated value derived from the aliphatic skeleton (X) in the polymer block (B) through $^{13}$C-NMR measurement of the block copolymer, and is more specifically a value measured according to the method described in Examples.

<Wight Average Molecular Weight of Polymer Block (B)>

The weight average molecular weight (Mw) of the polymer block (B) is not particularly limited, but the total weight average molecular weight of the polymer blocks (B) included in the block copolymer before hydrogenation is preferably 15,000 to 800,000, more preferably 20,000 to 700,000, further preferably 30,000 to 600,000, still further preferably 30,000 to 500,000, still further preferably 30,000 to 400,000. When the total weight average molecular weight of the polymer blocks (B) falls within the above-mentioned range, a more excellent vibration damping property may be easily exhibited.

<Content of Polymer Block (B)>

The content of the polymer block (B) in the block copolymer is preferably 99% by mass or less, more preferably 97% by mass or less, further preferably 94% by mass or less. When the content of the polymer block (B) is 99% by mass or less, it becomes easy to obtain the modified hydrogenated product or the resin composition containing this, which has a vibration damping property, and has mechanical properties, mechanical properties, and moldability suitable for various uses. In addition, the content of the polymer block (B) in the block copolymer is preferably 30% by mass or more, more preferably 35% by mass or more, further preferably 60% by mass or more, still further preferably 75% by mass or more, still further preferably 80% by mass or more, still further preferably 85% by mass or more. When the content of the polymer block (B) is 30% by mass or more, the modified hydrogenated product or the resin composition containing this may be more excellent in vibration damping.

(Bonding Mode of Polymer Block (A) and Polymer Block (B))

In the block copolymer, as long as the polymer block (A) and the polymer block (B) are bonded, the bonding form is not limited, and may be any one of a linear form, a branched form, a radial form, and a bonding mode as a combination of two or more of these. Among them, the bonding form between the polymer block (A) and the polymer block (B) is preferably linear. As an example, for the polymer block (A) represented by A, and the polymer block (B) represented by B, a diblock copolymer represented by A-B, a triblock copolymer represented by A-B-A or B-A-B, a tetrablock copolymer represented by A-B-A-B, a pentablock copolymer represented by A-B-A-B-A or B-A-B-A-B, and an (A-B)nX type copolymer (X represents a coupling agent residue, and n represents an integer of 3 or more) may be exemplified. Among them, the triblock copolymer or the diblock copolymer, in the linear form, is preferable, and the A-B-A type triblock copolymer is preferably used from the viewpoint of flexibility, ease of production, and the like.

Here, in this specification, when the same types of polymer blocks are linearly bonded via a bifunctional coupling agent or the like, the bonded polymer blocks are treated as a whole as one polymer block. Accordingly, polymer blocks, including the above-mentioned examples, which should be originally strictly denoted by Y-X-Y (X represents a coupling residue), are represented by Y as a whole, particularly unless it is necessary to distinguish it from a single polymer block Y. In this specification, since these types of polymer blocks including a coupling agent residue are treated as described above, for example, a block copolymer including a coupling agent residue, which should be strictly denoted by A-B-X-B-A (X represents a coupling agent residue), is denoted by A-B-A, and is treated as an example of a triblock copolymer.

(Content of Polymer Block (A) and Polymer Block (B))

As long as the object and effects of the present invention are not disturbed, the block copolymer may contain a polymer block constituted by other monomers as well as the polymer blocks (A) and (B). The total content of the polymer block (A) and the polymer block (B) is preferably 90% by mass or more, more preferably 95% by mass or more, particularly preferably substantially 100% by mass. When the total content of the polymer block (A) and the polymer block (B) in the block copolymer is 90% by mass or more, the modified hydrogenated product and the resin composition containing this may be excellent in vibration damping and moldability and may be suitably used for various uses.

(Polymerization Average Molecular Weight of Block Copolymer)

The weight average molecular weight (Mw) of the block copolymer is preferably 15,000 to 800,000, more preferably 50,000 to 700,000, further preferably 70,000 to 600,000, particularly preferably 70,000 to 500,000, most preferably 70,000 to 400,000. When the weight average molecular weight of the block copolymer is 15,000 or more, the thermal stability is further increased, and in the case of 800,000 or less, it becomes easy to obtain excellent moldability.

The weight average molecular weight of the hydrogenated block copolymer obtained by hydrogenating the block copolymer has the same as the preferable range of the block copolymer.

[Functional Group]

The modified hydrogenated product of the present invention may be produced by causing, for example, the hydrogenated block copolymer obtained by hydrogenating the block copolymer, to react with a compound having one or more functional groups selected from an alkoxysilyl group, a carboxy group, an amino group, a hydroxy group, an epoxy group, and an acid anhydride-derived group, and modifying the hydrogenated block copolymer through introduction of the functional groups. The corresponding functional groups are preferably one or more functional groups selected from an alkoxysilyl group and an acid anhydride-derived group. Specifically, a method of producing the modified hydrogenated product is the same as described below.

When the functional groups are introduced into the hydrogenated block copolymer, the resin composition containing the modified hydrogenated product of the present invention may be excellent in moldability and mechanical properties. In particular, in the resin composition containing the modified hydrogenated product of the present invention and a thermoplastic resin, particularly when the thermoplastic resin is a polar resin having a polar group having affinity or reactivity with the functional groups, the risk of occurrence of delamination is extremely lowered during molding of the resin composition. In addition, the modified hydrogenated product of the present invention preferably has the functional groups in the side chain. Accordingly, it is thought that a difference between the main chain and the side chain in molecular motility is increased, and a glass transition temperature is controlled so that an excellent vibration damping property in a wide range of temperatures may be exhibited. Then, it is possible to exhibit excellent moldability and mechanical properties while achieving a vibration damping property.

The content of the functional groups in the modified hydrogenated product is preferably 0.1 phr or more, more preferably 0.15 phr or more, further preferably 0.2 phr or more, still further preferably 0.25 phr or more. In addition, the content of the functional groups in the modified hydrogenated product is preferably 5.0 phr or less, more preferably 4.0 phr or less, further preferably 3.0 phr or less, still further preferably 2.0 phr or less, still further preferably 0.95 phr or less. When the content of the functional groups in the modified hydrogenated product falls within the above-mentioned range, the moldability of the resin composition containing the modified hydrogenated product of the present invention may be easily improved, and the vibration damping property and the mechanical properties are further improved. The content (phr) of the corresponding functional groups means parts by mass of functional groups with respect to 100 parts by mass of the modified hydrogenated product of the present invention, and may be obtained as, for example, parts by mass of a modifier used for introducing the corresponding functional groups, with respect to 100 parts by mass of the modified hydrogenated product of the present invention.

The content of the functional groups in the modified hydrogenated product may be calculated by titration or $^1$H-NMR measurement, and also may be calculated from a ratio of the charged amount of the modifier to be described below to the charged amount of the modified hydrogenated product.

[Conditions]

(Condition (1)) There is a characteristic in that the modified hydrogenated product of the present invention satisfies the following condition (1) from the viewpoint of thermal stability.

Condition (1): after stay at 330° C. for 30 min under nitrogen atmosphere, a weight change rate is −5.5% or more.

When the weight change rate in the condition (1) is less than −5.5%, the thermal stability becomes inferior, and then, it is not possible to exhibit moldability and mechanical properties desired in the present invention. From the viewpoint of obtaining more excellent thermal stability, moldability, and mechanical properties, the weight change rate in the condition (1) is preferably −5.3% or more, more preferably −5.0% or more. In addition, the upper limit value of the corresponding weight change rate is not particularly limited, but may be 0%, or may be −0.2%.

In addition, it is desirable that the hydrogenated product of the present invention further satisfies the following condition (1-1) from the viewpoint of thermal stability.

Condition (1-1): after stay at 330° C. for 60 min under nitrogen atmosphere, the weight change rate is −11.0% or more.

When the weight change rate in the (1-1) is −11.0% or more, the modified hydrogenated product and the resin composition containing this become more excellent in thermal stability, and also may be more excellent in moldability and mechanical properties. The weight change rate in the condition (1-1) is more preferably −10.5% or more, further preferably −10.0% or more. In addition, the upper limit value of the corresponding weight change rate is not particularly limited, but may be −0.5%, or may be −1.0%.

The weight change rates in the condition (1) and the condition (1-1) may be satisfied by adjusting the hydrogenation rate. For example, it is possible to realize a higher hydrogenation rate by optimizing selection or a content ratio of a monomer to be used for the block copolymer, and production conditions in the production method of the block copolymer, such as a polymerization method, and selection and addition amounts of a polymerization initiator, a cocatalyst, etc. The weight change rates in the condition (1) and the condition (1-1) are values measured according to the method described in Examples.

(Condition (2))

There is a characteristic in that the modified hydrogenated product of the present invention satisfies the following condition (2).

Condition (2): the peak top intensity of tan δ measured in accordance with JIS K7244-10 (2005), under conditions including a strain amount of 0.1%, a frequency of 1 Hz, a measurement temperature of −70 to 120° C., and a temperature rise rate of 3° C./min, is 1.0 or more.

The tan δ (loss tangent) is a ratio of loss modulus/storage modulus at a frequency of 1 Hz in the dynamic viscoelasticity measurement, and the peak top intensity of tan δ largely contributes to vibration damping, and other physical properties. Here, the peak top intensity of tan δ is a value of tan δ when the peak of tan δ is maximized.

In the present invention, measurement of the peak top intensity of tan δ may be carried out by using a test piece obtained by cutting a single-layer sheet into a disk shape. The single-layer sheet is prepared with a thickness of 1.0 mm by pressurizing the modified hydrogenated product at a temperature of 230° C., under a pressure of 10 MPa for 3 min. The measurement condition is the same as described in the condition (2).

In the present invention, the measurement device of tan δ is not particularly limited, but by using a rotary rheometer "ARES-G2" (manufactured by TA instruments) or the like, the test piece may be sandwiched between flat plates with a diameter of 8 mm so as to perform a test. More details are the same as described in Examples.

In the above-described measurement, the peak top intensity of tan δ of the modified hydrogenated product of the present invention becomes 1.0 or more, and a higher one may become 1.5 or more, or 1.9 or more. In addition, the upper limit value of the corresponding peak top intensity of tan δ is not particularly limited, but may be 3.0, may be 2.5, or may be 2.3. A higher peak top intensity of tan δ indicates that physical properties such as vibration damping are excellent at the temperature. When it is less than 1.0, it is not possible to obtain a sufficient vibration damping property desired in the present invention.

The peak top intensity in the condition (2) may be controlled by a method of optimizing selection or a content ratio of a monomer to be used for the block copolymer, or suitably adjusting an amount of vinyl bonds.

(Condition (3))

It is desirable that the modified hydrogenated product of the present invention further satisfies the following condition (3) from the viewpoint of exhibiting an excellent vibration damping property in a wide range of temperatures.

Condition (3): There is a series of temperature regions where tan δ measured in accordance with JIS K7244-10 (2005) under conditions including a strain amount of 0.1%, a frequency of 1 Hz, a measurement temperature of −70 to 120° C., and a temperature rise rate of 3° C./min is 0.5 or more, and a maximum width of these temperature regions is 13° C. or more.

Here, "a series of temperature regions where tan δ is 0.5 or more" indicates a continuous temperature range where tan δ is 0.5 or more, that is, tan δ in the corresponding temperature range is always 0.5 or more.

The description for the test piece for measuring tan δ is the same as the description in the condition (2).

The maximum width of the temperature regions in the condition (3) is preferably 15° C. or more, more preferably 20° C. or more, further preferably 25° C. or more, still further preferably 30° C. or more. The upper limit value of the maximum width is not particularly limited, but may be 40° C., may be 37° C., or may be 35° C.

Although there are no particular limitations, it is desirable that the modified hydrogenated product of the present invention further satisfies the following condition (3-1) from the viewpoint of exhibiting an excellent vibration damping property in a wide range of temperatures.

Condition (3-1): There is a series of temperature regions where tan δ measured in accordance with JIS K7244-10 (2005) under conditions including a strain amount of 0.1%, a frequency of 1 Hz, a measurement temperature of −70 to 120° C., and a temperature rise rate of 3° C./min is 1.0 or more, and a maximum width of these temperature regions is 5.5° C. or more.

The higher the value of tan δ, the better the vibration damping property, and then as the condition (3-1) is satisfied, the vibration damping property is further increased in a wide temperature region.

Here, the "series of temperature regions where tan δ is 1.0 or more" indicates a continuous temperature range where tan δ is 1.0 or more, that is, tan δ in the corresponding temperature range is always 1.0 or more.

The description for the test piece for measuring tan δ is the same as the description in the condition (3).

The maximum width of the temperature regions in the condition (3-1) is preferably 6.0° C. or more, more preferably 8.0° C. or more, further preferably 9.0° C. or more, still further preferably 14.0° C. or more, still further preferably 16.0° C. or more. The upper limit value of the maximum width is not particularly limited, but may be 25° C. or may be 20° C.

In addition, although there are no particular limitations, it is desirable that the modified hydrogenated product of the present invention further satisfies the following condition (3-2) from the viewpoint of exhibiting an excellent vibration damping property in a wide range of temperatures.

Condition (3-2): There is a series of temperature regions where tan δ measured in accordance with JIS K7244-10 (2005) under conditions including a strain amount of 0.1%, a frequency of 1 Hz, a measurement temperature of −70 to 120° C., and a temperature rise rate of 3 WC/min is 1.5 or more, and a maximum width of these temperature regions is 3.0° C. or more.

The higher the value of tan δ, the better the vibration damping property, and then as the condition (3-2) is satisfied, the vibration damping property is further increased in a wide temperature region.

Here, the "series of temperature regions where tan δ is 1.5 or more" indicates a continuous temperature range where tan δ is 1.5 or more, that is, tan δ in the corresponding temperature range is always 1.5 or more.

The description for the test piece for measuring tan δ is the same as the description in the condition (3).

The maximum width of the temperature regions in the condition (3-2) is preferably 3.3° C. or more, more preferably 4.0° C. or more, further preferably 5.0° C. or more, still further preferably 8.0° C. or more. The upper limit value of the maximum width is not particularly limited, but may be 15° C. or may be 13° C.

The condition (3), the condition (3-1), and the condition (3-2) may be satisfied by a method of optimizing selection or a content ratio of a monomer to be used for the block copolymer, or suitably adjusting various requirements such as an amount of vinyl bonds, a hydrogenation rate, and a content of the functional groups as described above.

(Condition (4))

It is desirable that the modified hydrogenated product of the present invention further satisfies the following condition (4) from the viewpoint of thermal stability, mechanical properties, and moldability.

Condition (4): The iodine value measured in accordance with JIS K0070 (1992) is less than 60.

When the iodine value is less than 60, the modified hydrogenated product exhibits an excellent thermal stability, and the resin composition containing the modified hydrogenated product tends to easily become excellent in mechanical properties and moldability. From the viewpoint of further improving thermal stability, mechanical properties, and moldability, the iodine value is preferably 57 or less, more preferably 54 or less, further preferably 51 or less. The lower limit value of the iodine value is not particularly limited, but may be 1.0 or may be 2.0. The iodine value in the condition (4) may be satisfied by optimizing selection or a content ratio of a monomer to be used for the polymer block (B), and production conditions in the production method of the block copolymer, such as, a polymerization method, selection and addition amounts of a polymerization initiator, a cocatalyst, etc.

[Others]

(Hydrogenation Rate)

In the modified hydrogenated product of the present invention, the hydrogenation rate of the polymer block (B) is preferably 78.0 mol % or more. That is, it is desirable that 78.0 mol % or more of the carbon-carbon double bonds included in the polymer block (B) is hydrogenated.

A high hydrogenation rate of the polymer block (B) is suitable for satisfying the above-described condition (1), and also it becomes easy to enhance a vibration damping property, and a thermal stability in a wide range of temperatures. In addition, the resin composition containing the modified hydrogenated product may be more excellent in moldability and mechanical properties. From the same viewpoint, the hydrogenation rate of the polymer block (B) is preferably 80.0 mol % or more, more preferably 83.0 mol % or more, further preferably 85.0 mol % or more, still further preferably 90.0 mol % or more. The upper limit value of the hydrogenation rate is not particularly limited, but the upper limit value may be 99.5 mol %, or may be 98.5 mol %.

In addition, in the hydrogenated block copolymer before modification, the hydrogenation rate of the polymer block (B) is preferably 85 mol % or more, more preferably 87 mol % or more, further preferably 89 mol % or more from the viewpoint of thermal stability. The upper limit value of the hydrogenation rate is not particularly limited, but the upper limit value may be 99 mol %, or may be 98 mol %.

The hydrogenation rate is a value of the content of carbon-carbon double bonds in the conjugated diene compound-derived structural unit in the polymer block (B), which may be obtained by $^1$H-NMR measurement, and is more specifically a value measured according to the method described in Examples.

(Peak Top Temperature of Tan δ)

In the modified hydrogenated product of the present invention, from the viewpoint of exhibiting an excellent vibration damping property in a wide range of temperatures, the temperature at which the peak top intensity of tan δ is obtained in the above-described condition (2), that is, the peak top temperature of tan δ, is not particularly limited as long as the effect of the present invention is not impaired. Like the peak top intensity, the peak top temperature of tan δ largely contributes to vibration damping, and other physical properties, and is preferably −60° C. or more, more preferably −55° C. or more. In addition, the peak top temperature of tan δ is preferably 120° C. or less, more preferably 110° C. or less.

When the peak top temperature of tan δ is −60° C. or more and 120° C. or less, under an actual use environment, it is possible to obtain a sufficient vibration damping property. In addition, the peak top temperature of tan δ may be properly specified according to physical properties required for various uses as well as the vibration damping property.

(Tertiary Carbon Atoms)

From the viewpoint of vibration damping, the modified hydrogenated product of the present invention preferably contains 1.0 or more tertiary carbon atoms. When 1.0 or more tertiary carbon atoms are contained as above, the vibration damping property tends to be excellent.

The number of tertiary carbon atoms means an average number of tertiary carbon atoms per structural unit in the polymer block (B) of the modified hydrogenated product, may be obtained by dividing the number of moles of tertiary carbon included in the polymer block (B) in the modified hydrogenated product of the present invention, by the number of moles of the structural unit constituting the corresponding polymer block (B), and may be calculated by, for example, the number of tertiary carbon atoms existing in vinyl bond units and the content of the vinyl bond units.

For example, when the modified hydrogenated product is a modified hydrogenated product that uses isoprene and/or butadiene as the above-described conjugated diene compound, and has an acid anhydride-derived group using maleic anhydride, as the modifier to be described below, the tertiary carbon is present in the main chain derived from the corresponding acid anhydride-derived group and the hydrogenated block copolymer. Specifically, there may be expression by the following chemical formula.

| Chemical Formula | | | |
|---|---|---|---|
| Isoprene structural unit | | Btadiene structural unit | |
| 1,4-Bond | 3,4-Bond | 1,4-Bond | 1,2-Bond |

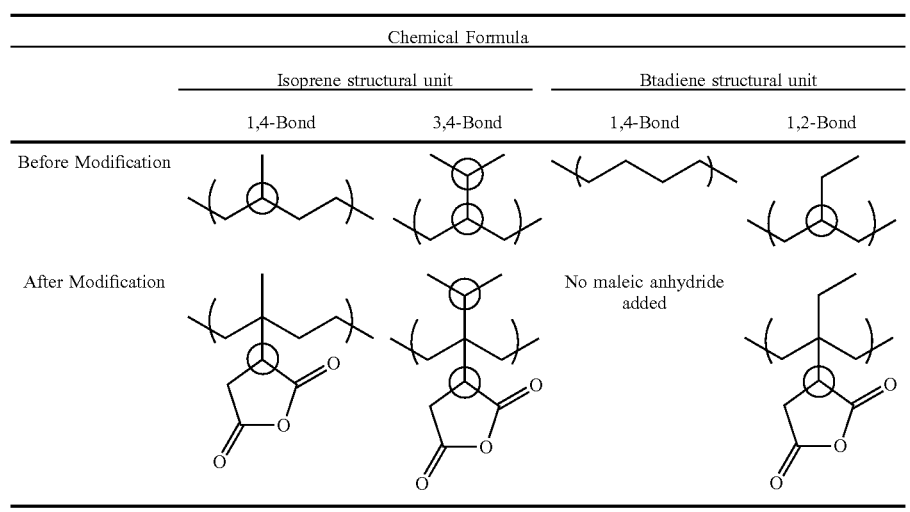

As represented by the chemical formulas, as tertiary carbon atoms (carbon surrounded by an ellipse), there is one for a 1,4-bond and there are two for a 3,4-bond in the modified isoprene structural unit, and there are 0 for a 1,4-bond and there is one for a 1,2-bond in the modified butadiene structural unit.

In addition, the content (mol %) of the 1,4-bond units and the 3,4-bond units in the isoprene structural unit, and the content (mol %) of the 1,4-bond units and the 1,2-bond units in the butadiene structural unit may be calculated by $^1$H-NMR measurement in the same manner as in the above-described measurement method of the amount of vinyl bonds.

More specifically, the number of tertiary carbon atoms may be obtained according to the method described in Examples.

(Weight Average Molecular Weight of Modified Hydrogenated Product)

The weight average molecular weight (Mw) of the modified hydrogenated product is preferably 15,000 to 800,000, more preferably 50,000 to 700,000, further preferably 70,000 to 600,000, particularly preferably 70,000 to 500,000, most preferably 70,000 to 400,000. When the weight average molecular weight of the modified hydrogenated product is 15,000 or more, the thermal stability is further improved, and in the case of 800,000 or less, the moldability may be also further improved.

<<Method of Producing Modified Hydrogenated Product>>

The modified hydrogenated product of the present invention uses at least an aromatic vinyl compound and a conjugated diene compound as monomers. These are polymerized into a block copolymer, and then before hydrogenation or after hydrogenation, through a step of performing a modification reaction of the block copolymer by using a modifier, the modified hydrogenated product may be produced.

[Block Copolymer]

The method of producing the modified hydrogenated product of the present invention includes a step of performing a polymerization reaction by using at least an aromatic vinyl compound and a conjugated diene compound as monomers to obtain a block copolymer that has a polymer block (A) containing a structural unit derived from the aromatic vinyl compound and a polymer block (B) containing a structural unit derived from the corresponding conjugated diene compound.

The aromatic vinyl compound, the conjugated diene compound, the polymer block (A), and the polymer block (B) are the same as described above in the description on the modified hydrogenated product of the present invention.

The polymerization reaction may be produced by, for example, a solution polymerization method, an emulsification polymerization method, a solid phase polymerization method or the like. Among them, the solution polymerization method is preferable, and, for example, conventionally known methods, such as an ionic polymerization method (such as anionic polymerization, and cationic polymerization), and a radical polymerization method, may be applied. Among them, an anionic polymerization method is preferable. In the anionic polymerization method, an aromatic vinyl compound and a conjugated diene compound are sequentially added in the presence of a solvent, an anionic polymerization initiator, and if necessary, a Lewis base so as to obtain a block copolymer, and then, if necessary, a coupling agent may be added so as to perform a reaction.

Examples of an organolithium compound that may be used as a polymerization initiator for anionic polymerization include methyl lithium, ethyl lithium, n-butyl lithium, sec-butyl lithium, tert-butyl lithium, and pentyl lithium. In addition, examples of a dilithium compound that may be used as a polymerization initiator include naphthalene dilithium, and dilithiohexylbenzene.

Examples of the coupling agent include dichloromethane, dibromomethane, dichloroethane, dibromoethane, dibromobenzene, and phenyl benzoate.

The used amounts of the polymerization initiator and the coupling agent are properly determined by a desired weight average molecular weight of the hydrogenated block copolymer. Generally, it is desirable to use the initiator such as an alkyl lithium compound, or a dilithium compound at a ratio of 0.01 to 0.2 parts by mass per 100 parts by mass of a total of monomers used for polymerization (such as an aromatic vinyl compound and a conjugated diene compound), and when the coupling agent is used, it is desirable that in the use thereof, the ratio is 0.001 to 0.8 parts by mass per 100 parts by mass of a total of the monomers.

The solvent is not particularly limited as long as it does not adversely affect an anionic polymerization reaction, and examples thereof include aliphatic hydrocarbon such as cyclohexane, methyl cyclohexane, n-hexane, and n-pentane; and aromatic hydrocarbon such as benzene, toluene, and xylene. In addition, the polymerization reaction is carried out generally at a temperature of 0 to 100° C., preferably at 10 to 70° C., for 0.5 to 50 h, preferably for 1 to 30 h.

In addition, the content of 3,4-bonds and 1,2-bonds (amount of vinyl bonds) may be increased through a method of adding a Lewis base as a cocatalyst during polymerization of the conjugated diene compound.

Examples of the Lewis base that may be used include: ethers such as dimethyl ether, diethyl ether, tetrahydrofuran, and 2,2-di(2-tetrahydrofuryl)propane (DTHFP); glycol ethers such as ethylene glycol dimethyl ether, diethylene glycol dimethyl ether, triethylene glycol dimethyl ether, and tetraethylene glycol dimethyl ether; amines such as triethylamine, N,N,N',N'-tetramethylenediamine, N,N,N',N'-tetramethylethylenediamine (TMEDA), and N-methylmorpholine; and metal salts, for example, sodium or potassium salts of aliphatic alcohol such as sodium t-butyrate, sodium t-amylate or sodium isopentylate, or sodium or potassium salts of alicyclic alcohol such as dialkyl sodium cyclohexanolate, for example, sodium mentholate. Among the Lewis bases, from the viewpoint of vibration damping and thermal stability, it is desirable to use tetrahydrofuran and DTHFP. In addition, it is more desirable to use DTHFP since a large amount of vinyl bonds can be obtained, a high hydrogenation rate is easily achieved without using an excessive amount of hydrogenation catalyst, and both a more excellent vibration damping property and a thermal stability can be realized.

These Lewis bases may be used alone or two or more thereof may be used in combination.

The addition amount of the Lewis base is determined according to how much amount of vinyl bonds of an isoprene unit and/or a butadiene unit constituting the polymer block (B) is controlled especially when the polymer block (B) contains a structural unit derived from isoprene and/or butadiene. Therefore, the addition amount of the Lewis base is not limited in the strict sense, but using within the range of generally 0.1 to 1,000 moles, preferably 1 to 100 moles per gram atom of lithium contained in an alkyl lithium compound or a dilithium compound used as a polymerization initiator is preferable.

After the polymerization is performed by the above-described method, an active hydrogen compound such as alcohols, carboxylic acids, or water may be added so as to stop the polymerization reaction. Then, the block copolymer may be obtained.

[Hydrogenated Block Copolymer]

The block copolymer obtained in the step may be hydrogenated so as to obtain a hydrogenated block copolymer. After modified by the method described below, the block copolymer may be hydrogenated.

When the block copolymer is hydrogenated, a hydrogenation reaction is carried out in an inert organic solvent in the presence of a hydrogenation catalyst.

Through the hydrogenation reaction, carbon-carbon double bonds derived from the conjugated diene compound in the polymer block (B) in the block copolymer are hydrogenated so that a hydrogenated product of the block copolymer may be obtained.

The hydrogenation reaction may be carried out at a hydrogen pressure of about 0.1 to 20 MPa, preferably 0.5 to 15 MPa, more preferably 0.5 to 5 MPa, at a reaction temperature of about 20 to 250° C., preferably 50 to 180° C., more preferably 70 to 180° C., for a reaction time of generally 0.1 to 100 h, preferably 1 to 50 h.

Examples of the hydrogenation catalyst include Raney nickel; a heterogeneous catalyst in which metal such as Pt, Pd, Ru, Rh, or Ni is supported on a simple substance such as carbon, alumina, or diatomite; a Ziegler-based catalyst composed of a combination of a transition metal compound, an alkyl aluminum compound, an alkyl lithium compound, etc.; and a metallocene-based catalyst. Among them, from the viewpoint of easily suppressing nuclear hydrogenation of an aromatic ring, a Ziegler-based catalyst is preferable, a Ziegler-based catalyst composed of a combination of a transition metal compound and an alkyl aluminum compound is more preferable, and a Ziegler-based catalyst (Al/Ni-based Ziegler catalyst) composed of a combination of a nickel compound and an alkyl aluminum compound is further preferable.

The hydrogen block copolymer obtained in this manner may be acquired by pouring and solidifying a polymerization reaction solution in methanol, etc. and then performing heating or drying under reduced pressure, or by performing so-called steam stripping in which together with steam, the polymerization reaction solution is poured in hot water, and a solvent is azeotropically removed, and performing heating or drying under reduced pressure.

[Modified Hydrogenated Product]

The modified hydrogenated product of the present invention may be produced by introducing the above-described functional groups before or after the block copolymer is subjected to the hydrogenation, but in the case of modification by a radical reaction, from the viewpoint of reaction control, it is desirable that after the hydrogenated block copolymer is obtained through hydrogenation of the block copolymer, specific functional groups are introduced for the production.

In addition, the reaction of introducing the above-described functional groups into the hydrogenated block copolymer and causing modification (hereinafter, referred to as a "modification reaction") may be carried out by a conventionally known method.

The modification reaction may be carried out by dissolving, for example, the hydrogenated block copolymer in an organic solvent, adding, thereto, various modifiers capable of adding the above-described functional groups, and causing a reaction at about 50 to 300° C., for about 0.5 to 10 h.

In addition, the modification reaction may be carried out by melting, for example, the hydrogenated block copolymer by using an extruder or the like without using a solvent, and adding various modifiers. In this case, the temperature for the modification reaction is generally equal to or higher than the melting point of the hydrogenated block copolymer and is equal to or less than 400° C., preferably 90 to 350° C., more preferably 100 to 300° C., and the reaction time is generally about 0.5 to 10 min.

In addition, it is desirable to add a radical initiator when the modification reaction is carried out in a melted state, and an aging inhibitor may be added from the viewpoint of suppressing a side reaction.

In the method of producing the modified hydrogenated product of the present invention, it is desirable that the modification reaction is carried out by the latter method of causing modification in a melted state from the viewpoint of easily improving workability, or a vibration damping property and a thermal stability.

That is, in a preferable embodiment, the method of producing the modified hydrogenated product of the present invention further includes a step of introducing one or more functional groups selected from an alkoxysilyl group, a carboxy group, an amino group, a hydroxy group, an epoxy group, and an acid anhydride-derived group into the hydrogenated block copolymer in a melted state by using a radical initiator after the corresponding hydrogenated block copolymer is obtained through hydrogenation of the block copolymer.

Examples of the modifier capable of adding the functional groups, include dimethyldiethoxysilane, tetramethoxysilane, tetraethoxysilane, 3-aminopropyltriethoxysilane, vinyltrimethoxysilane, vinyltriethoxysilane, hydroxymethyltriethoxysilane, vinylbenzyldiethylamine, vinylbenzyldimethylamine, 1-glycidyl-4-(2-pyridyl)piperazine, 1-glycidyl-4-phenyl piperazine, 1-glycidyl-4-methylpiperazine, 1-glycidyl-4-methylhomopiperazine, 1-glycidyl hexamethyleneimine, and tetraglycidyl-1,3-bisaminomethyl cyclohexane, and in addition, examples of the modifier include unsaturated carboxylic acid anhydride such as maleic anhydride, citraconic anhydride, 2,3-dimethylmaleic anhydride, or itaconic anhydride. Further, from modifiers described in Japanese Laid-open Patent Publication No. 2011-132298, a modifier capable of adding the functional groups may be employed. The modifier may be used alone or two or more thereof may be used in combination.

The addition amount of the modifier may be properly determined such that a desired amount of the functional groups is contained, according to the content of the functional groups in the above-described modified hydrogenated product, but the modifier is generally about 0.01 to 10 parts by mass, preferably 0.01 to 5 parts by mass, more preferably 0.01 to 3 parts by mass, further preferably 0.05 to 2 parts by mass with respect to 100 parts by mass of the hydrogenated block copolymer or the block copolymer.

Examples of the radical initiator include organic peroxides or organic peresters such as dialkyl peroxides, diacyl peroxides, peroxy esters, peroxy ketals, dialkyl peroxides, and hydroperoxides, and further, examples thereof include azo compounds such as azobis isobutyronitrile, and dimethyl azoisobutyrate. Among the radical initiators, organic peroxides are preferable, and dialkyl peroxides are more preferable.

The addition amount of the radical initiator may be properly determined by a combination of the hydrogenated block copolymer and the modifier, but the radical initiator is generally about 0.01 to 10 parts by mass, preferably 0.01 to 5 parts by mass, more preferably 0.01 to 3 parts by mass, further preferably 0.05 to 2 parts by mass with respect to 100 parts by mass of the hydrogenated block copolymer.

<<Resin Composition>>

In addition, the present invention provides a resin composition containing the above-described modified hydrogenated product.

The resin composition may exhibit an excellent vibration damping property by containing the modified hydrogenated product, and is also excellent in moldability and mechanical properties because the compatibility with other resin materials is good.

The other resin materials are not particularly limited, and resins such as a thermosetting resin and a thermoplastic resin may be exemplified. From the viewpoint of compatibility and moldability, a thermoplastic resin (including a thermoplastic elastomer) is preferable.

[Thermoplastic Resin]

It is desirable that the resin composition of the present invention contains a component (I) as the above-described modified hydrogenated product, and a component (II) as the thermoplastic resin.

In addition, the thermoplastic resin is not particularly limited as long as the object and effects of the present invention are not impaired. Meanwhile, since the above-described modified hydrogenated product has a functional group having a high polarity, such as an alkoxysilyl group, a carboxy group, an amino group, a hydroxy group, an epoxy group, or an acid anhydride-derived group, the thermoplastic resin is preferably a polar resin from the viewpoint of easily realizing higher compatibility with the modified hydrogenated product, and exhibiting more excellent moldability and mechanical properties.

Examples of the thermoplastic resin include a polyphenylene ether-based resin, a styrene-based resin, an acrylic resin, a polycarbonate-based resin, a polyamide-based resin, a polyphenylene sulfide-based resin, a polyacetal-based resin, a polyvinyl alcohol-based resin, and a polyester-based resin. Among the thermoplastic resins, it is more preferable to use a polycarbonate-based resin, a polyamide-based resin, a polyphenylene sulfide-based resin, a polyacetal-based resin, and a polyester-based resin from the viewpoint of mechanical properties and solvent resistance. The thermoplastic resin may be used alone or two or more thereof may be used in combination.

(Polyamide-Based Resin)

Examples of the polyamide-based resin include aliphatic polyamide, semi-aromatic polyamide, wholly aromatic polyamide, and transparent polyamide (non-crystalline or microcrystalline polyamide). These polyamide-based resins may be properly selected according to the performance required for various uses, but semi-aromatic polyamide is preferable from the viewpoint of compatibility with the modified hydrogenated product, moldability, or the like since characteristics such as high heat resistance or low water absorption may be provided.

In the present invention, the semi-aromatic polyamide refers to polyamide containing a dicarboxylic acid unit having an aromatic dicarboxylic acid unit as a main component, and a diamine unit having an aliphatic diamine unit as a main component, or polyamide containing a dicarboxylic acid unit having an aliphatic dicarboxylic acid unit as a main component, and a diamine unit having an aromatic diamine unit as a main component. Here, "having as a main component" means accounting for 50 to 100 mol %, preferably 60 to 100 mol %, in all units.

Among them, it is preferable that the semi-aromatic polyamide has a terephthalic acid unit or a naphthalene dicarboxylic acid unit, and an aliphatic diamine unit. In addition, the semi-aromatic polyamide may further contain a dicarboxylic acid unit derived from aliphatic dicarboxylic acid, alicyclic dicarboxylic acid, aromatic dicarboxylic acid or the like as well as the terephthalic acid unit or the naphthalene dicarboxylic acid unit.

In addition, the aliphatic diamine unit may be any one of diamine units derived from linear aliphatic diamine, branched chain aliphatic diamine, and alicyclic diamine, and is preferably a diamine unit derived from alicyclic diamine.

Among the alicyclic diamines, from the viewpoint that low water absorption and heat resistance, as well as a vibration damping property, mechanical properties, and moldability may be expected in the resin composition, aliphatic diamine having 4 to 18 carbon atoms, such as 1,4-butane diamine, 2-methyl-1,5-pentane diamine, 1,6-hexane diamine, 1,8-octane diamine, 2-methyl-1,8-octane diamine, 4-methyl-1,8-octane diamine, 1,9-nonane diamine, 1,10-decane diamine, 1,11-undecane diamine, and 1,12-dodecane diamine, is more preferable, aliphatic diamine having 9 carbon atoms is further preferable, and 2-methyl-1,8-octane diamine, and 1,9-nonane diamine are still further preferable. These alicyclic diamines may be used alone or two or more thereof may be used in combination.

Examples of the semi-aromatic polyamide include, in addition to those having the terephthalic acid unit or the naphthalene dicarboxylic acid unit, and the aliphatic diamine unit, isophthalamide copolymer (polyamide 66/6 I), and polyhexamethylene adipamide/polyhexamethylene isophthalamide/polycaproamide copolymer (polyamide 66/6I/6).

Examples of the aliphatic polyamide include polycaproamide (polyamide 6), polypentamethylene adipamide (polyamide 56), polyhexamethylene adipamide (polyamide 66), polyundecaneamide (polyamide 11), polylauryllactam (polyamide 12), polytetramethylene adipamide (polyamide 46), polytetramethylene sebacamide (polyamide 410), polypentamethylene sebacamide (polyamide 510), polyhexamethylene sebacamide (polyamide 610), polyhexamethylene dodecamide (polyamide 612), polydecamethyleneadipamide (polyamide 106), and polydecamethylene sebacamide (polyamide 1010).

Examples of the wholly aromatic polyamide include those synthesized from aromatic dicarboxylic acid, and aromatic diamine, such as polyparaphenylene terephthalamide.

The polyamide-based resin may be used alone or two or more thereof may be used in combination.

Specific examples of the transparent polyamide include polyamide homopolymers, such as polycaprolactam (PA6), poly-ω-aminoheptanoic acid (PA7), poly-ω-aminononanoic acid (PA9), polyundecaneamide (PA11), polylaurinlactam (PA12), polyethylenediamine adipamide (PA26), polytetramethylene adipamide (PA46), polyhexamethylene diadipamide (PA66), polyhexamethylene sebacamide (PA610), polyhexamethylene decamide (PA612), polyoctamethylene adipamide (PA86), polydecamethylene adipamide (PA106), polydecamethylene sebacamide (PA1010), polydecamethylene dodecamide (PA1212), methaxylene diamine-6 nylon (MXD6), polyhexamethylene isophthalamide (PA6I), polymethaxylylene isophthalamide (PAMXDI), a homopolymer (PAMACM10) obtained through condensation between bis-(4-amino-3-methyl-cyclohexyl)methane (MACM) and 1,10-decane dicarboxylic acid, a homopolymer (PAMACM12) obtained through condensation between MACM and sebacic acid, and a homopolymer (PACM12) obtained through condensation between bis-(4-amino-cyclohexyl)-methane) (aka: 4,4'-diaminodicyclohexylmethane) and 1,10-decane dicarboxylic acid; and polyamide copolymers, such as a caprolactam/laurinlactam copolymer (PA6/12), a caprolactam/hexamethylene diammonium adipate copolymer (PA6/66), a laurinlactam/hexamethylene diammonium sebacate copolymer (PA12/610), a hexamethylene diammonium adipate/hexamethylene diammonium sebacate copolymer (PA66/610), a caprolactam/hexamethylene diammonium adipate/hexamethylene diammonium sebacate copolymer (PA6/66/610), PA6I/6T, PAMXDI/6I, PAMXDI/MXDT/6I/6T, PAMXDI/12I, PAMACM12, PAMACMI/12, PAMACMI/MACMT/12, PA6J/MACMI/12, PA6I/6T/MACMI/MACMT, PA6I/6T/MACMI/MACMT/12, PAMACM6/11, PAMACMI/MACM12, PACMT/PACM10/610 (ACM is abbreviation of bis-(4-amino-cyclohexyl)-methane) (4,4'-diaminodicyclohexylmethane)), PACMT/PACM10/614, PACMT/PACM14/614, PACMT/618, PACMT/12, PACMT/MACM14/12, PACMT/MACM14/614, PACMT/IPD14/614 (IPD is abbreviation of isophorone diamine), and a copolymer having a polyamide unit obtained through condensation between aliphatic alkylene diamine having 4 to 12 carbon atoms and 2,6-naphthalene dicarboxylic acid, and a polyamide unit obtained through condensation between aliphatic alkylene diamine having 4 to 12 carbon atoms and isophthalic acid.

Among these transparent polyamides, in view of vibration damping, mechanical strength, heat resistance, oil resistance, thermal stability, moldability, and the like, PA6, PA610, PA612, PA11, PA12, and PACM12 are preferable.

Examples of the transparent polyamide also include commercially available products. Examples of the commercially available products include Trogamid CX7323, Trogamid T, Trogamid CX9701 (product names, these are from Daicel Degussa), Grilamid TR-90, Grilamid TR-155, Grivory G21, Grilamid TR-55 LX, Grilon TR-27 (these are from EMS-CHEMIE-Japan), Cristamid MS1100, Cristamid MS1700 (these are from Arkema), Selar 3030 E, Selar PA-V2031, and isoamide PA-7030 (these are from DuPont).

(Polyphenylene Sulfide-Based Resin)

The polyphenylene sulfide-based resin is not particularly limited as long as the effect of the present invention is not impaired, and examples thereof include polymers mainly including a unit in which a phenylene group and a sulfur atom are alternately bonded. Examples of the phenylene group include a p-phenylene group, an m-phenylene group, a substituted phenylene group having a substituent (an alkyl group, an alkoxyl group, a carboxy group, etc.), and a p, p'-biphenylene group.

In addition, examples of the polyphenylene sulfide-based resin include an oxidative-crosslinked type and a linear type.

The polyphenylene sulfide-based resin may be used alone or two or more thereof may be used in combination.

(Polyphenylene Ether-Based Resin)

Examples of the polyphenylene ether-based resin include poly(2,6-dimethyl-1,4-phenylene)ether, poly(2,6-diethyl-1,4-phenylene)ether, poly(2-methyl-6-ethyl-1,4-phenylene) ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether, poly(2,6-diphenyl-1,4-phenylene)ether, poly(2,6-ditolyl-1,4-phenylene)ether, poly (2,6-dichloro-1,4-phenylene)ether, poly(2,6-dibenzyl-1,4-phenylene)ether, and poly(2,5-dimethyl-1,4-phenylene) ether.

The polyphenylene ether-based resin may be used alone or two or more thereof may be used in combination.

(Styrene-Based Resin)

Examples of the styrene-based resin include polyalkylstyrenes such as polystyrene, polymethylstyrene, polydimethylstyrene, and polyt-butylstyrene; polyhalogenated styrenes such as polychlorostyrene, polybromostyrene, polyfluorostyrene, and polyfluorostyrene; polyhalogeno-substituted alkylstyrenes such as polychloromethylstyrene; polyalkoxystyrenes such as polymethoxystyrene, and polyethoxystyrene; polycarboxyalkylstyrenes such as polycarboxymethylstyrene; polyalkyl ether styrenes such as polyvinylbenzylpropyl ether; polyalkylsilylstyrenes such as polytrimethylsilylstyrene; poly(vinylbenzyldimethoxyphosphide), and acrylonitrile-butadiene-styrene copolymer.

The styrene-based resin may be used alone or two or more thereof may be used in combination.

(Acrylic Resin)

Examples of the acrylic resin include those mainly composed of structural units derived from (meth)acrylic acid esters.

Examples of the (meth)acrylic acid ester include alkyl esters of (meth)acrylic acid, such as methyl (meth)acrylate, ethyl (meth)acrylate, propyl (meth)acrylate, butyl (meth) acrylate, and 2-ethylhexyl (meth)acrylate. The acrylic resin may have a structural unit derived from one or more types of these (meth)acrylic acid esters.

The acrylic resin may be used alone or two or more thereof may be used in combination.

In this specification, "(meth)acryl" means "acryl" or "methacryl."

(Polycarbonate-Based Resin)

The polycarbonate-based resin may be either aliphatic polycarbonate or aromatic polycarbonate. Examples thereof include polycarbonate-based resins produced from divalent phenols such as bisphenol A, hydroquinone, 2,2-bis(4-hydroxyphenyl)pentane, 2,4-dihydroxydiphenylmethane, bis(2-hydroxyphenyl)methane, and bis(4-hydroxyphenyl)methane, and carbonate precursors such as phosgene, halogen formate, and carbonate ester.

The polycarbonate-based resin may be used alone or two or more thereof may be used in combination.

(Polyester-Based Resin)

The polyester-based resin may be either aliphatic polyester or aromatic polyester, which is formed from a biodegradable polymer, such as polylactic acid, polyglycolic acid or polycaprolactone, or a carboxylic acid component, such as aliphatic dicarboxylic acid or aromatic dicarboxylic acid, and a diol component, such as aliphatic diol, alicyclic diol, or aromatic diol.

Examples of the aliphatic polyester include polyethylene succinate, polybutylene succinate, polybutylene succinate adipate, and polyhydroxy butyrate-polyhydroxyvalerate copolymer.

Examples of the aromatic polyester include polyethylene terephthalate (PET), isophthalic acid modified polyethylene terephthalate, dimethylisophthalic acid modified polyethylene terephthalate, sulfoisophthalic acid modified polyethylene terephthalate, polytrimethylene terephthalate, polybutylene terephthalate, and polyhexamethylene terephthalate.

The polyester-based resin may be used alone or two or more thereof may be used in combination.

(Polyacetal-Based Resin)

The polyacetal-based resin is not particularly limited as long as it is a polymer mainly having an oxymethylene group unit, and may be, for example, either a polyoxymethylene homopolymer or a polyoxymethylene copolymer.

When the polyacetal-based resin is the polyoxymethylene copolymer, examples of a structural unit other than the oxymethylene group unit include oxyalkylene groups such as an oxyethylene group, an oxypropylene group, and an oxytetramethylene group. In addition, the polyoxymethylene copolymer may have any of forms such as random, block, and graft.

The polyacetal-based resin may be used alone or two or more thereof may be used in combination.

(Polyvinyl Alcohol-Based Resin)

Examples of the polyvinyl alcohol-based resin include polyvinyl alcohol resin, ethylene-vinyl alcohol copolymer resin, butene diol vinyl alcohol copolymer resin, and polyvinyl butyral resin.

The polyvinyl alcohol-based resin may be used alone or two or more thereof may be used in combination.

(Content ratio of Component (I) and Component (II))

In addition, in the resin composition of the present invention, the content ratio [(I)/(II)] of the component (I) and the component (II) is preferably 1/99 to 99/1 as a mass ratio, more preferably 5/95 to 90/10, further preferably 10/90 to 90/10. The content ratio of the component (I) and the component (II) may be adjusted from the viewpoint of vibration damping, mechanical properties, moldability, and the like. When the content ratio of the component (I) is increased, the vibration damping property tends to be further improved.

(Various Additives)

The resin composition may further contain various additives in addition to the component (I) and the component (II), as long as the effect of the present invention is not impaired. Examples of these additives include inorganic filler such as talc, clay, mica, calcium silicate, glass, glass hollow sphere, glass fiber, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomite, alumina, titanium oxide, iron oxide, zinc oxide, magnesium oxide, tin oxide, antimony oxide, barium ferrite, strontium ferrite, carbon black, graphite, carbon fiber, activated carbon, carbon hollow sphere, calcium titanate, lead zirconate titanate, silicon carbide, and mica; and organic filler such as wood flour, and starch.

Examples of the additives include a processing aid, a reinforcing material, a plasticizer, an open-cell foaming agent, a thermal stabilizer, a light stabilizer, an ultraviolet absorber, an antioxidant, a lubricant, an antistatic agent, an antibacterial agent, a fungicide, a dispersant, a colorant, an auxiliary foaming agent, a crystal nucleating agent, a flame retardant, an auxiliary flame retardant, a liquid lubricant, and a solid lubricant.

The additives may be used alone or two or more thereof may be used in combination.

The content of the additives in the resin composition is not limited, and may be properly adjusted according to the types of the corresponding additives, the use of the resin composition or the like. When the resin composition contains the additives, the content of the additives may be, for example, 50% by mass or less, 45% by mass or less, or 30% by mass or less, and may be 0.01% by mass or more, 0.1% by mass or more, or 1% by mass or more with respect to 100% by mass of the total amount of the resin composition.

The total content of the component (I) and the component (II) may be, for example, 50% by mass or more, 55% by mass or more, or 70% by mass or more, and may be 99.99% by mass or less, 99.9% by mass or less, or 99% by mass or less with respect to 100% by mass of the total amount of the resin composition.

(Method of Producing Resin Composition)

The method of producing the resin composition of the present invention is not particularly limited, and a conventionally known means may be used for production. For example, the component (I) and the component (II), and, if necessary, various additives may be mixed by using a mixer such as a Henschel mixer, a V blender, a ribbon blender, a tumbler blender, or a conical blender in the production, or thereafter, melt-kneading may be performed by using a kneader such as a single-screw extruder, a twin-screw extruder, a kneader, a Banbury mixer, or a roll at about 80 to 350° C. so as to produce the resin composition of the present invention.

In addition, the resin composition may also be produced by dissolving the components in a solvent in which the components [at least the component (I) and the component (II)] are soluble, mixing them, and removing the solvent.

The resin composition may take any of shapes such as a bale, a crumb, and a pellet. In addition, the resin composition may become various molded products by a melt-knead molding machine, or by an injection molding method, an injection compression molding method, an extrusion molding method, a blow molding method, a press molding method, a vacuum molding method, or a foam molding method, which uses a bale, a crumb, a pellet or the like of the resin composition, as a raw material.

[Vibration Damping]

The resin composition of the present invention may exhibit a good vibration damping property in a wide range of temperature regions.

The good vibration damping property in a wide range of temperature regions, which is exhibited by the resin composition of the present invention, may be achieved by suitably controlling selection or a content ratio of a monomer to be used for the above-described modified hydrogenated product, the balance between the amount of vinyl bonds and the hydrogenation rate, the method of producing the modified hydrogenated product, and other components or the like of the modified hydrogenated product of the present invention, and also through a combination of the modified hydrogenated product and the resin used for the resin composition, the content ratio thereof, and the like.

For example, on a molded test piece with a length of 200 mm, a width of 10 mm, and a thickness of 2 mm, which is obtained by using the resin composition of the present invention, a damping test may be carried out by a central vibration method in accordance with JIS K7391 (2008), and then, a loss factor may be measured so that the vibration damping property may be evaluated as follows.

At a frequency of 300 Hz, and a temperature of 20° C., the loss factor is preferably 0.008 or more. In addition, the loss factor may be 0.009 or more, 0.020 or more, or 0.030 or more.

At a frequency of 300 Hz, and a temperature of 40° C., the loss factor is preferably 0.008 or more. In addition, the loss factor may be 0.009 or more, 0.020 or more, or 0.030 or more.

At a frequency of 300 Hz, and a temperature of 60° C., the loss factor is preferably 0.008 or more. In addition, the loss factor may be 0.009 or more, 0.020 or more, or 0.026 or more.

At a frequency of 300 Hz, and a temperature of 80° C., the loss factor is preferably 0.008 or more. In addition, the loss factor may be 0.009 or more, 0.015 or more, or 0.023 or more.

At a frequency of 300 Hz, and a temperature of 100° C., the loss factor is preferably 0.008 or more. In addition, the loss factor may be 0.009 or more, or 0.014 or more.

At a frequency of 1500 Hz, and a temperature of 20° C., the loss factor is preferably 0.010 or more. In addition, the loss factor may be 0.020 or more, or 0.030 or more.

At a frequency of 1500 Hz, and a temperature of 40° C., the loss factor is preferably 0.010 or more. In addition, the loss factor may be 0.020 or more, or 0.030 or more.

At a frequency of 1500 Hz, and a temperature of 60° C., the loss factor is preferably 0.008 or more. In addition, the loss factor may be 0.020 or more, or 0.030 or more.

At a frequency of 1500 Hz, and a temperature of 80° C., the loss factor is preferably 0.008 or more. In addition, the loss factor may be 0.020 or more, or 0.027 or more.

At a frequency of 1500 Hz, and a temperature of 100° C., the loss factor is preferably 0.008 or more. In addition, the loss factor may be 0.015 or more, or 0.019 or more.

The exhibition of vibration damping by the resin composition of the present invention is not limited to the embodiment. In addition, more specifically, the loss factor is a value measured according to the method described in Examples.

[Mechanical Properties]

(Tensile Characteristic)

The resin composition of the present invention is excellent in the tensile characteristics such as a tensile strength (MPa), a tensile fracture strain (%), and a tensile elastic modulus (GPa) since the above-described modified hydrogenated product is excellent in thermal stability, and the compatibility between the modified hydrogenated product and the resin is good.

For example, when measurement is performed in accordance with JIS K7161-1 (2014) (ISO527-1:2012) by using an ISO multipurpose test piece (A type) made of the resin composition of the present invention, in each tensile test, the resin composition may exhibit the following properties and states.

A preferable numerical range of the tensile characteristic measured in accordance with the standard is described below, but the preferable range may be specified according to other resin materials or the like to be blended with the modified hydrogenated product, or uses thereof. In addition, more specifically, each of the following tensile characteristics is a value measured according to the method described in Examples.

(1) Tensile Strength (MPa)

The tensile strength of the resin composition of the present invention, which is measured in accordance with the standard, is preferably 50 MPa or more, more preferably 55 MPa or more, and may also exhibit 60 MPa or more, 65 MPa or more, or 70 MPa or more. The upper limit of the tensile strength is not particularly limited, and a higher numerical value is preferable.

(2) Tensile Fracture Strain (%)

The tensile fracture strain of the resin composition of the present invention, which is measured in accordance with the standard, is preferably 2.0% or more, more preferably 2.5% or more, and may also exhibit 5.0% or more, 8.0% or more, or 10.0% or more. The upper limit of the tensile fracture strain is not particularly limited, and may be properly specified according to uses.

(3) Tensile Elastic Modulus (GPa)

The tensile elastic modulus of the resin composition of the present invention, which is measured in accordance with the standard, is preferably 2.0 GPa or more. The upper limit of the tensile elastic modulus is not particularly limited, and may be properly specified according to uses.

(Bending Characteristic)

As in the above-described tensile characteristics, the resin composition of the present invention is excellent in the bending characteristics such as a bending strength (MPa), and a flexural modulus (GPa) since the modified hydrogenated product is excellent in thermal stability, and the compatibility between the modified hydrogenated product and the resin is good.

For example, when measurement is performed in accordance with JIS K7171 (2016) (ISO178:2010) by using an ISO multipurpose test piece (A type) made of the resin composition of the present invention, in each bending test, the resin composition may exhibit the following properties and states.

A preferable numerical range of the bending characteristic measured in accordance with the standard is described below, but the preferable range may be specified according to other resin materials or the like to be blended with the modified hydrogenated product or uses thereof. In addition, more specifically, each of the following bending characteristics is a value measured according to the method described in Examples.

(1) Bending Strength (MPa)

The bending strength of the resin composition of the present invention, which is measured in accordance with the standard, is preferably 90 MPa or more, more preferably 96

MPa or more. The upper limit of the bending strength is not particularly limited, and may be properly specified according to uses.

(2) Flexural Modulus (GPa)

The flexural modulus of the resin composition of the present invention, which is measured in accordance with the standard, is preferably 2.1 GPa or more. The upper limit of the flexural modulus is not particularly limited, and may be properly specified according to uses.

<<Various Uses>>

Since the modified hydrogenated product of the present invention is excellent in vibration damping and thermal stability, the resin composition of the present invention is excellent in vibration damping, mechanical properties, and moldability. In addition, the modified hydrogenated product and the resin composition of the present invention may also exhibit physical properties such as adhesiveness, and thus may be used in various applications requiring the properties. Thus, the present invention may also provide pellets, bales, damping materials, sound insulating materials, dam rubber, sole materials, flooring materials, an adhesive or a sticking agent, a laminate, automobile parts, molded bodies such as a film and a sheet, and the like, which use the above-described modified hydrogenated product or the resin composition.

Using for the automobile parts, for example, structural parts such as a torque rod and a cylinder head cover; drive system parts such as various gears, a sliding door roller, and a clutch peripheral part; and fuel system parts such as a fuel pipe, a quick connector, and a pump module, is possible.

When the modified hydrogenated product of the present invention is used for various applications, the modified hydrogenated product may be used alone, or may also be used as a composition in which various additives exemplified in the above-described resin composition are mixed.

The configuration of the laminate may be a configuration that includes, for example, an X layer containing the modified hydrogenated product or the resin composition of the present invention, and a Y layer laminated on at least one side surface of the X layer.

The thickness of the X layer may be properly selected according to various uses, and is not particularly limited as long as the effect of the present invention is not impaired. From the viewpoint of easily exhibiting an excellent vibration damping property, the thickness of the X layer is preferably 10 μm or more, more preferably 30 μm or more, further preferably 50 μm or more, still further preferably 70 μm or more. In addition, the thickness of the X layer is preferably 800 μm or less, more preferably 500 μm or less, further preferably 400 μm or less, still further preferably 350 μm or less, still further preferably 150 μm or less.

The Y layer may be properly selected according to various uses, but examples thereof include a glass layer, a layer containing a thermoplastic resin other than the modified hydrogenated product of the present invention (an adhesive auxiliary layer, a skin layer or the like), and the like. Examples of the thermoplastic resin other than the modified hydrogenated product of the present invention, include a polyvinylacetal resin, an ionomer, an ethylene-vinyl acetate copolymer, a urethane resin, and a polyamide resin.

In addition, the laminate may be a laminate configured by one X layer and one Y layer, may be a laminate configured by one X layer and two or more Y layers, may be a laminate configured by two or more X layers and one Y layer, or may be a laminate configured by two or more X layers and two or more Y layers.

The configuration of the laminate of the present invention is not particularly limited as long as the X layer is represented by "X," and the Y layer is represented by "Y," but Y/X/Y, Y/X, and Y/X/Y/X/Y may be exemplified. The plurality of Y layers may be made of the same materials, or different materials. Therefore, in the case of different materials, when the Y layers made of different materials are represented in the order of "Y1," "Y2," "Y3" . . . , although there is no particular limitation, examples of the configuration of the laminate of the present invention include Y1/X/Y1, Y2/Y1/X/Y1/Y2, Y1/X/Y2, X/Y1/Y2, Y1/X/Y2/Y3, and Y1/X/Y2/X/Y3. Among them, a laminate having a configuration of Y1/X/Y1, Y2/Y1/X/Y1/Y2, or Y1/X/Y2 is preferable, and a laminate having a configuration of Y1/X/Y1, or Y2/Y1/X/Y1/Y2 is more preferable.

The laminate may be used for use in a damping material or a sound insulating material, for example, for use in a damping material or a sound insulating material of automobiles. When the laminate has uses in the damping material or the sound insulating material of automobiles, examples of additives to be used include, besides the modified hydrogenated product and the resin composition of the present invention, an antioxidant, a UV absorber, a light stabilizer, a heat shield material, an anti-blocking agent, a pigment, a dye, a softening agent, a cross-linking agent, an auxiliary cross-linking agent, and a cross-linking accelerator, but there is no limitation to these. These additives may be used alone or two or more thereof may be used in combination.

In addition, the method of producing the laminate of the present invention is not particularly limited, and examples thereof include a method using a vacuum laminator, a method using a vacuum bag, a method using a vacuum ring, and a method using a nip roll.

The modified hydrogenated product and the resin composition of the present invention may have, besides the uses, other uses such as weather strips, floor mats, dash insulators, roof linings, door panels, engine head covers, door hole seals, and fender liners, and are also useful for these uses.

In addition, examples of the automobile parts include cooling parts such as a thermostat housing, a radiator tank, a radiator hose, a water outlet, a water pump housing, and a rear joint; intake/exhaust system parts such as an intercooler tank, an intercooler case, a turbo duct pipe, an EGR cooler case, a resonator, a throttle body, an intake manifold, and a tail pipe; fuel system parts such as a fuel delivery pipe, a gasoline tank, a canister, an oil strainer, a lock nut, and a sealing material; structural parts such as a mount bracket; brake system parts such as an air brake tube; in-vehicle electrical parts such as a wire harness connector within an engine room, a motor part, a sensor, an ABS bobbin, a combination switch, and an in-vehicle switch; and interior/exterior parts such as a sliding door damper, a door mirror stay, a door mirror bracket, an inner mirror stay, a roof rail, an engine mount bracket, an inlet pipe of an air cleaner, a door checker, a plastic chain, an emblem, a clip, a breaker cover, a cup holder, an airbag, a fender, a spoiler, a radiator support, a radiator grill, a louver, an air scoop, a hood bulge, a back door, and a fuel sender module.

In addition, using for an adhesive or a sticking agent, a sealing material, a packing, an O ring, a belt, a sound proofing material, and the like, is possible in various electrical products in the field of home appliances, such as TVs, various recorders such as Blu-ray recorders or HDD recorders, projectors, game machines, digital cameras, home videos, antennas, speakers, electronic dictionaries, IC recorders, FAX machines, copy machines, telephones, doorphones, rice cookers, microwave ovens, oven ranges, refrigerators, dishwashers, dish dryers, IH cooking heaters, hot plates, vacuum cleaners, washing machines, chargers, sewing machines, irons, dryers, electric bicycles, air purifiers, water purifiers, electric toothbrushes, lighting equipment, air conditioners, outdoor units of the air-conditioners, dehumidifiers, and humidifiers.

EXAMPLES

Hereinafter, the present invention will be specifically described by Examples and Comparative Examples, but the present invention is not limited by these.
<Modified Hydrogenated Product>
[Method of Measuring Each Physical Property]
In regard to a modified hydrogenated product or the like obtained in Examples and Comparative Examples to be described below, each physical property was evaluated according to the following measurement method.
(Content of Polymer Block (A))
The modified hydrogenated product was dissolved in $CDCl_3$ and $^1H$-NMR measurement [device: "ADVANCE 400 Nano bay" (manufactured by Bruker), measurement temperature: 30° C.] was carried out. Then, the content of the polymer block (A) was calculated from the ratio of a peak area derived from styrene, and a peak area derived from isoprene and/or butadiene.
(Weight Average Molecular Weights of Polymer Block (A), Polymer Block (B), Hydrogenated Block Copolymer, and Modified Hydrogenated Product)
Through gel permeation chromatography (GPC) measurement under the following conditions, the weight average molecular weights (Mw) of the hydrogenated block copolymer and the modified hydrogenated product, in terms of polystyrene, were obtained.
In addition, the weight average molecular weights (Mw) of the polymer blocks (A) and (B) were obtained by measuring a sampled liquid through GPC measurement under the following conditions each time polymerization of each polymer block was completed in the production process.
<GPC Measurement Device and Measurement Condition>
  device: GPC device "HLC-8020" (manufactured by Tosoh Corporation)
  separation column: two "TSKgel G4000HX" manufactured by Tosoh Corporation were connected in series
  eluent: tetrahydrofuran
  eluent flow rate: 0.7 mL/min
  sample concentration: 5 mg/10 mL
  column temperature: 40° C.
  detector: differential refractometer (RI) detector
  calibration curve: created using standard polystyrene
(Hydrogenation Rate in Polymer Block (B))
The hydrogenated block copolymer before modification was dissolved in $CDCl_3$ and $^1H$-NMR measurement [device: "ADVANCE 400 Nano bay" (manufactured by Bruker), measurement temperature: 30° C.] was carried out. Then, the hydrogenation rate was calculated from the ratio of a peak area derived from residual olefin of isoprene or butadiene and a peak area derived from ethylene, propylene or butylene.
(Amount of Vinyl Bonds in Polymer Block (B))
The block copolymer before hydrogenation was dissolved in $CDCl_3$ and $^1H$-NMR measurement [device: "ADVANCE 400 Nano bay" (manufactured by Bruker), measurement temperature: 30° C.] was carried out. Then, the amount of vinyl bonds (the sum of contents of 3,4-bond units and 1,2-bond units) was calculated from the ratio of peak areas corresponding to 3,4-bond units and 1,2-bond units in the isoprene structural unit and 1,2-bond units in the butadiene structural unit, to a total peak area of the structural units derived from isoprene and/or butadiene.

Content of Aliphatic Skeleton (X) In Polymer Block (B)
600 mg of the block copolymer before hydrogenation and 40 mg of $Cr(acac)_3$ were dissolved in 4 ml of $CDCl_3$, and quantitative $^{13}C$-NMR measurement (pulse program: zgig, Inverse gated 1H decoupling method) [device: "ADVANCE 400 Nano bay" (manufactured by Bruker), measurement temperature: 30° C.] was carried out by using a 10 mm-NMR tube. Then, the content of each of the aliphatic skeletons X, X1 and X2 in the polymer block (B) was calculated by the following method.
In Table 3, X, X1, and X2 indicate following aliphatic skeletons.
X: aliphatic skeleton having a combination of the following substituents (i) to (vi)
X1: aliphatic skeleton having a combination of the following substituents (i) and (iv)
X2: aliphatic skeleton having a combination of the following substituents (ii), (iii), (v), and (iv)
(i): $R^1$=hydrogen atom, $R^2$=hydrogen atom, $R^3$=hydrogen atom; (1,2 Bd+Bd)
(ii): $R^1$=hydrogen atom, $R^2$=methyl group, $R^3$=hydrogen atom; (1,2Bd+1,2 Ip)
(iii): $R^1$=hydrogen atom, $R^2$=hydrogen atom, $R^3$=methyl group; (1,2Bd+3,4 Ip)
(iv): $R^1$=methyl group, $R^2$=hydrogen atom, $R^3$=hydrogen atom; (1,2 Ip+Bd)
(v): $R^1$=methyl group, $R^2$=methyl group, $R^3$=hydrogen atom; (1,2Ip+1,2 Ip)
(iv): $R^1$=methyl group, $R^2$=hydrogen atom, $R^3$=methyl group; (1,2Ip+3,4 Ip)
[Calculation Method]
Table 1-1 illustrates each peak and a derived structure. When integrated values of peaks are a to g, respectively, each structure has the integrated value noted in Table 1-2, and the contents of X, X1, and X2 may be calculated as (a+g−c)/(a+b+c−d+e/2+2f), (g−c)/(a+b+c−d+e/2+2f), and a/(a+b+c−d+e/2+2f), respectively.

TABLE 1-1

| Peak (ppm) | Structure | Integrated value |
| --- | --- | --- |
| 108~110 | X2 | a |
| 110~113 | 3.4Ip + 1.2Ip + X1 | b |
| 113~116 | 1.2Bd | c |
| 122~127 | 1.4Ip + St | d |
| 127~132 | 1.4Bd × 2 + St × 4 | e |
| 132~137 | 1.4Ip | f |
| 142~145 | 1.2Bd + X1 | g |

TABLE 1-2

| Structure | Integrated value |
| --- | --- |
| St | d − f |
| 1.4Ip | f |
| 3.4Ip + 1.2Ip | b − (g − c) |
| 1.4Bd | (e − (d − f) × 4)/2 |
| 1.2Bd | c |
| X1 | g − c |
| X2 | a |
| Sum | a + b + c − d + e/2 + 2f |

(Modification Amount)

<Maleic Anhydride>

5 g of the modified hydrogenated product was dissolved in 180 ml of toluene, and 20 ml of ethanol was added thereto. Through titration with a potassium hydroxide solution (0.1 mol/L), a modification amount was calculated by using the following calculation formula.

maleic anhydride modification amount (phr)=titration amount x 5.611/sample amount x 98×100/56.11×1000

<Vinyltrimethoxysilane>

The modified hydrogenated product was dissolved in $CDCl_3$ and $^1$H-NMR measurement [device: "ADVANCE 400 Nano bay" (manufactured by Bruker), measurement temperature: 30° C.] was carried out. The modification amount was calculated from the ratio of a peak area corresponding to a trimethoxysilyl group, to a total peak area of a styrene structural unit.

(Iodine Value after Modification)

The iodine value of the modified hydrogenated product was measured in accordance with JIS K0070 (1992).

(Hydrogenation Rate after Modification) The modified hydrogenated product was dissolved in $CDCl_3$ and $^1$H-NMR measurement [device: "ADVANCE 400 Nano bay" (manufactured by Bruker), measurement temperature: 30° C.] was carried out. Then, the hydrogenation rate was calculated from the ratio of a peak area derived from residual olefin of isoprene or butadiene, and a peak area derived from ethylene, propylene, and butylene.

(Weight Change Rate)

A polymer solution obtained by dissolving the modified hydrogenated product in cyclohexane was subjected to reprecipitation with acetone/methanol so that a modifier (maleic anhydride or vinyl trimethoxysilane) remaining in the modified hydrogenated product was removed. This was vacuum-dried at 60° C. for 4 h to adjust the modified hydrogenated product from which the residual modifier was removed. This was used for the following measurement of the weight change rate.

10 mg of the modified hydrogenated product from which the residual modifier was removed was weighed, and left (i) under a nitrogen atmosphere of 330° C., for 30 min, or left (ii) under a nitrogen atmosphere of 330° C., for 60 min.

After stay under the condition (i) or (ii), the weight was measured (weight after the test), and the weight change rate before and after the test was calculated from the following equation.

weight change rate (%)=(weight after test−weight before test)/weight before test×100

(Tan δ: Peak Top Temperature, Peak Top Intensity, and Maximum Width of Temperature Regions)

The modified hydrogenated product was pressurized at a temperature of 230° C., at a pressure of 10 MPa for 3 min by a press-molding device "NF-50T" (manufactured by Shinto Metal Industries Ltd.) to prepare a sheet with a thickness of 1.0 mm. A test piece was obtained by cutting this sheet into a disk shape with a diameter of 8 mm.

As a measurement device, a rotary rheometer "ARES-G2" (manufactured by TA instruments) which is a distortion control-type dynamic viscoelasticity device was used in accordance with JIS K7244-10 (2005). The test piece was placed between flat plates with a diameter of 8 mm, and vibration was applied at a strain amount of 0.1%, at a frequency of 1 Hz. A test was performed while the temperature was raised at 3° C./min from −70° C. to 120° C.

Through the test, the temperature at which the corresponding maximum peak intensity was obtained (peak top temperature), the maximum peak intensity of tan δ (peak top intensity), the maximum width of a series of temperature regions where tan δ is 0.5 or more, the maximum width of a series of temperature regions where tan δ is 1.0 or more, and the maximum width of a series of temperature regions where tan δ is 1.5 or more were obtained.

(Number of Tertiary Carbon Atoms)

The total number of tertiary carbon atoms in the modified hydrogenated product was calculated on the basis of the following method.

As in the method of measuring the amount of vinyl bonds in the modified hydrogenated product, the content (mol %) of 1,4-bond units and 3,4-bond units in the isoprene structural unit, and the content (mol %) of 1,4-bond units and 1,2-bond units in the butadiene structural unit were calculated through $^1$H-NMR measurement. Calculation was performed by multiplying the content (mol %) of each of these bond units, by the following number of tertiary carbon atoms present in the bond unit, and dividing by 100.

When maleic anhydride is used as the modifier, as the tertiary carbon atoms, there is one for a 1,4-bond and there are two for a 3,4-bond in the isoprene structural unit, and there are 0 for a 1, 4-bond and there is one for a 1,2-bond in the butadiene structural unit. In addition, when vinyltrimethoxysilane is used as the modifier, as the tertiary carbon atoms, there are 0 for a 1,4-bond and there is one for a 3,4-bond in the isoprene structural unit, and there are 0 for a 1,4-bond and a 1,2-bond in the butadiene structural unit.

As a specific example, calculation methods in Example 1 (Y-1), Example 2 (Y-2), Comparative Example 3 (Y-9) will be described below.

Example 1 (Y-1)

Number of tertiary carbon atoms=[content (mol %) of isoprene 1,4-bonds×1+content (mol %) of isoprene 3,4-bonds×2]/100=[18(mol %)×1+82 (mol %)×2]/100=1.82

Example 2 (Y-2)

Number of tertiary carbon atoms={[content (mol %) of isoprene 1,4-bonds×1+content (mol %) of isoprene 3,4-bonds×2]×0.5+[content (mol %) of butadiene 1,4-bonds×0+content (mol %) of butadiene 1,2-bonds×1]×0.5}/100={[7(mol %)×1+93(mol %)×2]×0.5+[30(mol %)×0+70 (mol %)×1]×0.5}/100=1.32

Comparative Example 3 (Y-9)

Number of tertiary carbon atoms=[content (mol %) of butadiene 1,4-bonds×0+content (mol %) of butadiene 1,2-bonds×1]/100=[60(mol %)×0+40 (mol %)×2]/100=0.40

[Production of Modified Hydrogenated Product]

Example 1

(1) Hydrogenated Block Copolymer

In a pressure-resistant container that had been replaced with nitrogen, and dried, 50 kg of cyclohexane (solvent) dried with molecular sieves A4, and 0.09 kg of sec-butyl lithium cyclohexane solution with a concentration of 10% by mass as an anionic polymerization initiator (substantial addition amount of sec-butyl lithium: 90 g) were charged.

After the temperature inside the pressure-resistant container was raised to 50° C., 1.0 kg of styrene (1) was added to perform polymerization for 30 min. Then, the temperature was lowered to 40° C., 0.033 kg of 2,2-di(2-tetrahydrofuryl) propane (DTHFP) was added as a Lewis base, and 14.7 kg of isoprene was added for 5 h to perform polymerization for 1 h. Then, the temperature was raised to 50° C., and 1.0 kg of styrene (2) was added to perform polymerization for 30 min. Methanol was added to stop the reaction, and a reaction solution containing a triblock copolymer of polystyrene-polyisoprene-polystyrene was obtained.

The reaction solution was heated to 50° C., and pressurized to a hydrogen pressure of 1 MPa, and then a Ziegler-based catalyst (hydrogenation catalyst) formed of nickel octylate and trimethyl aluminum was added thereto under a hydrogen atmosphere. While the temperature was raised to 80° C. by the reaction heat, the reaction was performed until absorption of hydrogen disappeared. This reaction solution was allowed to be cooled and to release pressure, and was washed with water to remove the Ziegler-based catalyst. Through vacuum-drying, a hydrogenated block copolymer of the triblock copolymer of polystyrene-polyisoprene-polystyrene was obtained.

(2) Modified Hydrogenated Product

A twin-screw extruder "ZSK26mc" (26 mmcp, L/D=56) manufactured by Coperion was used under the following extrusion conditions, and 10 kg of the obtained hydrogenated block copolymer was blended and was placed in a melted state. 0.01 kg of 2,5-dimethyl-2,5-di(t-butylperoxy) hexane (perhexa 25 B-40, manufactured by NOF Corporation), as a radical initiator, and 0.1 kg of maleic anhydride, as a modifier, were blended, and then, a modification reaction was carried out to obtain a modified hydrogenated product (hereinafter, referred to as "Y-1").

In regard to the obtained modified hydrogenated product, Table 2 illustrates the evaluation results of physical properties.

<Extrusion Condition> twin-screw extruder temperature setting: resin feed port 40° C., cylinder inlet 150° C., adapter 210° C., die 210° C.

screw rotation speed: 300 rpm

Examples 2 to 6, and 23 and Comparative Examples 1 to 3

Modified hydrogenated products (Y-2 to Y-10) were obtained in the same manner as in Example 1 except that each component and the used amount thereof were changed as noted in Table 1-3. In regard to the obtained modified hydrogenated products, Table 2 illustrates the evaluation results of physical properties.

Comparative Example 1 (Y-7) is an unhydrogenated block copolymer, which could not be modified because the reaction could not be controlled during the modification reaction and the block copolymer was gelled.

TABLE 1-3

| | | | Example | | | | | | | Comparative Example | | |
|---|---|---|---|---|---|---|---|---|---|---|---|---|
| | | | 1 | 2 | 3 | 4 | 5 | 6 | 23 | 1 | 2 | 3 |
| | Modified hydrogenated product | | Y-1 | Y-2 | Y-3 | Y-4 | Y-5 | Y-6 | Y-10 | Y-7 | Y8 | Y9 |
| Used amount (kg) | Cyclohexane | | 50 | 50 | 50 | 50 | 50 | 50 | 50 | 50 | 50 | 50 |
| | Sec-butyl lithium (10.5 mass % cyclohexane solution) | | 0.09 | 0.09 | 0.125 | 0.163 | 0.165 | 0.09 | 0.09 | 0.102 | 0.102 | 0.22 |
| | (A) | Styrene (1) | 1.0 | 1.0 | 1.7 | 1.5 | 5.4 | 1.0 | 1.0 | 1.7 | 1.7 | 2.5 |
| | | Styrene (2) | 1.0 | 1.0 | 1.7 | 1.5 | 5.4 | 1.0 | 1.0 | 1.7 | 1.7 | 2.5 |
| | (B) | Isoprene | 14.7 | 8.2 | 13.3 | 13.7 | 5.8 | 14.7 | 8.2 | 13.3 | 13.3 | — |
| | | Butadiene | — | 6.5 | — | — | — | — | 6.5 | — | — | 11.7 |
| | Lewis base | TMEDA | — | — | — | — | — | — | — | 0.07 | 0.07 | — |
| | | Tetrahydrofuran | — | — | 0.29 | — | — | — | — | — | — | 0.11 |
| | | DTHFP | 0.033 | 0.033 | — | — | — | 0.033 | 0.033 | — | — | — |
| Hydrogenation | Al/Ni-based Ziegler catalyst | | 5.7 | 3.1 | 2.2 | 1.6 | 0.8 | 5.7 | 3.1 | — | 11.0 | 1.4 |
| Modification | Hydrogenated block copolymer | | 10 | 10 | 10 | 10 | 10 | 10 | 10 | 10 | 10 | 10 |
| | Maleic anhydride | | 0.1 | 0.1 | 0.1 | 0.1 | 0.1 | — | 0.02 | 0.1 | 0.1 | 0.1 |
| | Vinyltrimethoxysilane | | — | — | — | — | — | 0.1 | — | — | — | — |
| | Radical initiator | | 0.01 | 0.01 | 0.01 | 0.01 | 0.01 | 0.01 | 0.005 | 0.01 | 0.01 | 0.01 |

TABLE 2

| | Example | | | | | |
|---|---|---|---|---|---|---|
| | 1 | 2 | 3 | 4 | 5 | 6 |
| Used modified hydrogenated product | Y-1 | Y-2 | Y-3 | Y-4 | Y-5 | Y-6 |
| Structural unit of polymer block (A) | St | St | St | St | St | St |
| Component constituting polymer block (B) | Ip | Ip/Bd | Ip | Ip | Ip | Ip |
| Mass ratio of component constituting polymer block(B) | 100 | 55/45 | 100 | 100 | 100 | 100 |
| Molar ratio of component constituting polymer block(B) | 100 | 50/50 | 100 | 100 | 100 | 100 |
| Polymer structure | A/B/A | A/B/A | A/B/A | A/B/A | A/B/A | A/B/A |
| Content (mass %) of polymer block (A) | 12 | 12 | 20 | 18 | 65 | 12 |
| Weight average molecular weight of polymer block (A) | 7,300 | 7,300 | 8,000 | 5,300 | 19,000 | 7,300 |
| Weight average molecular weight of polymer block (B) | 144,000 | 168,000 | 106,000 | 76,000 | 34,000 | 144,000 |
| Weight average molecular weight of hydrogenated block copolymer | 129,000 | 167,000 | 110,000 | 97,000 | 77,000 | 129,000 |

TABLE 2-continued

| | | | | | | |
|---|---|---|---|---|---|---|
| Hydrogenation rate (mol %) of polymer block (B) | 91 | 95 | 89 | 99 | 99 | 91 |
| Amount of vinyl bonds (mol %) of polymer block (B) | 82 | 76 | 60 | 7 | 7 | 82 |
| (X) content (mol %) of polymer block (B) | 1.2 | 15 | 0 | 0 | 0 | 1.2 |
| Maleic anhydride modification amount (phr) | 0.60 | 0.58 | 0.48 | 0.67 | 0.87 | — |
| Vinyltrimethoxysilane modification amount (phr) | — | — | — | — | — | 0.57 |
| Iodine value (g/100 g) after modification | 44.0 | 29.2 | 50.9 | 3.6 | 4.6 | 37.0 |
| Hydrogenation rate (NMR mol %) after modification | 85.6 | 92.0 | 83.3 | 99.1 | 98.3 | 87.6 |
| Weight change rate (%) at DTA 330° C._30 min (after washing) | −4.9 | −2.1 | −3.7 | −0.5 | −0.5 | −4.5 |
| Weight change rate (%) at DTA 330° C._60 min (after washing) | −10.0 | −4.2 | −7.5 | −1.5 | −1.5 | −9.4 |
| Tan δ peak top temperature (° C.) | 33.9 | 14.7 | −3.83 | −51.5 | 104.4 | 34.5 |
| Tan δ peak top intensity | 2.06 | 2.23 | 2.04 | 1.96 | 1.69 | 2.03 |
| Tan δ width ≥0.5 (° C.) | 36.1 | 31.0 | 25.7 | 15.8 | 20.5 | 34.6 |
| Tan δ width ≥1.0 (° C.) | 20.1 | 18.3 | 14.5 | 8.6 | 9.2 | 19.7 |
| Tan δ width ≥1.5 (° C.) | 11.2 | 10.1 | 7.9 | 4.0 | 3.3 | 10.4 |
| Number of tertiary carbon atoms after modification | 1.82 | 1.32 | 1.60 | 1.07 | 1.07 | 1.81 |
| Weight average molecular weight of modified hydrogenated product | 127,300 | 166,000 | 109,000 | 97,700 | 79,000 | 127,500 |

| | Example | Comparative Example | | |
|---|---|---|---|---|
| | 23 | 1 | 2 | 3 |
| Used modified hydrogenated product | Y-10 | Y-7 | Y-8 | Y-9 |
| Structural unit of polymer block (A) | St | St | St | St |
| Component constituting polymer block (B) | Ip/Bd | Ip | Ip | Bd |
| Mass ratio of component constituting polymer block(B) | 55/45 | 100 | 100 | 100 |
| Molar ratio of component constituting polymer block(B) | 50/50 | 100 | 100 | 100 |
| Polymer structure | A/B/A | A/B/A | A/B/A | A/B/A |
| Content (mass %) of polymer block (A) | 12 | 20 | 20 | 30 |
| Weight average molecular weight of polymer block (A) | 7,300 | 9,500 | 9,500 | 7,500 |
| Weight average molecular weight of polymer block (B) | 168,000 | 113,000 | 113,000 | 70,000 |
| Weight average molecular weight of hydrogenated block copolymer | 167,000 | 135,300 | 135,300 | 77,900 |
| Hydrogenation rate (mol %) of polymer block (B) | 95 | 0 | 80 | 99 |
| Amount of vinyl bonds (mol %) of polymer block (B) | 76 | 73 | 73 | 40 |
| (X) content (mol %) of polymer block (B) | 15 | 1.9 | 1.9 | 0 |
| Maleic anhydride modification amount (phr) | 0.11 | *1 | 1.00 | 0.57 |
| Vinyltrimethoxysilane modification amount (phr) | — | *1 | — | — |
| Iodine value (g/100 g) after modification | 29.6 | *1 | 74.0 | 6.6 |
| Hydrogenation rate (NMR mol %) after modification | 92.6 | *1 | 75.0 | 99.1 |
| Weight change rate (%) at DTA 330° C._30 min (after washing) | −1.9 | *1 | −6.2 | −0.5 |
| Weight change rate (%) at DTA 330° C._60 min (after washing) | −4.1 | *1 | −11.8 | −1.5 |
| Tan δ peak top temperature (° C.) | 14.3 | *1 | 22.4 | −47.0 |
| Tan δ peak top intensity | 2.26 | *1 | 1.62 | 0.35 |
| Tan δ width ≥0.5 (° C.) | 30.8 | *1 | 30.3 | *2 |
| Tan δ width ≥1.0 (° C.) | 18.1 | *1 | 15.2 | *2 |
| Tan δ width ≥1.5 (° C.) | 9.9 | *1 | 4.6 | *2 |
| Number of tertiary carbon atoms after modification | 1.32 | *1 | 1.73 | 0.40 |
| Weight average molecular weight of modified hydrogenated product | 166,000 | *1 | 133,500 | 78,200 |

In Table 2, *1 and *2 indicate the followings.
*1: was not measured because modification was impossible. The same also applies to Table 3.
*2: was not measured because tan δ did not satisfy a specific value.

From the evaluation results of tan δ noted in Table 2, in regard to the modified hydrogenated product of Example, it can be said that since the peak top intensity of tan δ is 1.0 or more, a vibration damping property is excellent, and the excellent vibration damping property can be exhibited in a wide range of temperature regions. Further, the modified hydrogenated product of Example has a weight change rate of −5.5% or more, and thus it can be found that a thermal stability is excellent because the change rate is small.

Meanwhile, in Comparative Example 1, in the above-described modification method, the block copolymer was gelled, and in Comparative Examples 2 and 3, a result that either vibration damping or thermal stability became inferior was obtained. Comparative Example 2 has the same composition as that of Example in Patent Literature 1 as described above. Although vibration damping is excellent, the hydrogenation rate was not high and a sufficiently excellent thermal stability could not be obtained.

<Resin Composition>
[Method of Measuring Each Physical Property]

In regard to a resin composition obtained in Examples and Comparative Examples to be described below, each physical property was evaluated according to the following measurement method.

(Loss Factor)

The resin composition was injection-molded by an injection molding machine "UH1000" (manufactured by Nissei Plastic Industrial Co., Ltd.) at a cylinder temperature of 320° C., a mold temperature of 140° C., and an injection pressure of 80 MPa, and a test piece with a length of 200 mm, a width of 10 mm, and a thickness of 2 mm was prepared.

Next, the sample was set in a mechanical impedance device (mass canceling amplifier MA-5500; channel data station DS-2100, manufactured by Ono Sokki Co., Ltd.), and then a damping test was carried out by a central vibration method in accordance with JIS K7391 (2008), and a loss factor was calculated by a half-width method.

Specifically, the steel plate side in the central portion of the sample was fixed to the tip portion of an excitation force detector built in an impedance head of a vibrator (power amplifier/model371-A) of the device. Then, while vibration was applied to the central portion of the sample at a frequency of 0 to 8000 Hz, the damping test for the measurement sample was carried out according to the central vibration method, and an excitation force in the central portion and an acceleration signal indicating an acceleration waveform were detected. The measurement was performed on each sample at temperatures of 0° C., 20° C., 40° C., 60° C., 80° C., and 100° C.

On the basis of the obtained excitation force and a speed signal obtained by integrating the acceleration signal, a mechanical impedance at the excitation point (the central portion of the laminate to which vibration was applied) was obtained. An impedance curve obtained by the frequency (as a horizontal axis) and the mechanical impedance (as a vertical axis) was created. From the full width at half maximum of the second peak ($2^{nd}$ mode) counted from the low frequency side, and the full width at half maximum of the fourth peak ($4^{th}$ mode), the loss factor of the laminate as the measurement sample was obtained at each temperature.

(Tensile Characteristic)

The resin composition was injection-molded by an injection molding machine "SE100DU-C250" (manufactured by Sumitomo Heavy Industries, Ltd.) at a cylinder temperature of 320° C., a mold temperature of 140° C., and an injection pressure of 80 MPa, and an ISO multipurpose test piece (A type) was prepared.

By using the test piece, in accordance with JIS K7161-1 (2014) (ISO527-1: 2012), a tensile strength (MPa), a tensile fracture strain (%), and a tensile elastic modulus (GPa) were measured.

(Bending Characteristic)

The resin composition was injection-molded by an injection molding machine "SE100DU-C250" (manufactured by Sumitomo Heavy Industries, Ltd.) at a cylinder temperature of 320° C., a mold temperature of 140° C., and an injection pressure of 80 MPa, and thus an ISO multipurpose test piece (A type) was prepared and was cut into a length of 80 mm, a width of 10 mm, and a thickness of 4 mm.

By using the test piece, in accordance with JIS K7171 (2016) (ISO178:2010), a bending strength (MPa), and a flexural modulus (GPa) were measured.

(Injection-Moldability)

The resin composition was injection-molded by an injection molding machine "UH1000" (manufactured by Nissei Plastic Industrial Co., Ltd.) at a cylinder temperature of 320° C., a mold temperature of 140° C., and an injection pressure of 80 MPa, to prepare a test piece with a length of 110 mm, a width of 110 mm, and a thickness of 2 mm.

The obtained test piece was observed with naked eyes, and the moldability was evaluated by the following criteria.

<Evaluation Criteria>

A: the surface state of the test piece is smooth.

B: peeling (delamination) is occurring on the surface of the test piece.

[Production of Resin Composition]

Examples 7 to 12 and Comparative Examples 4 to 6

Under the conditions including a cylinder temperature of 320° C., and a screw rotation speed of 150 rpm, by using a twin-screw extruder ("TEM-26SS" manufactured by Shibaura Machine Co., Ltd.), the modified hydrogenated products (Y-1 to Y-9) obtained in Examples and Comparative Examples and the following resin were supplied and melt-kneaded according to the formulation noted in Table 3, and resin compositions were produced.

In regard to the obtained resin compositions, Table 3 illustrates the evaluation results of physical properties.

<Resin>

Semi-Aromatic Polyamide

[composed of a terephthalic acid unit, and a 1,9-nonane diamine unit and a 2-methyl-1,8-octane diamine unit (1,9-nonane diamine unit: 2-methyl-1,8-octane diamine unit=80: 20 (molar ratio)), melting point: 300° C.]

TABLE 3

| | | | Example 7 | Example 8 | Example 9 | Example 10 | Example 11 | Example 12 | Comparative Example 4 | Comparative Example 5 | Comparative Example 6 |
|---|---|---|---|---|---|---|---|---|---|---|---|
| Resin composition | Semi-aromatic polyamide | mass % | 90 | 90 | 90 | 90 | 90 | 90 | 90 | 90 | 90 |
| | Modified hydrogenated product Y-1 | | 10 | | | | | | | | |
| | Modified hydrogenated product Y-2 | | | 10 | | | | | | | |
| | Modified hydrogenated product Y-3 | | | | 10 | | | | | | |
| | Modified hydrogenated product Y-4 | | | | | 10 | | | | | |
| | Modified hydrogenated product Y-5 | | | | | | 10 | | | | |
| | Modified hydrogenated product Y-6 | | | | | | | 10 | | | |
| | Modified hydrogenated product Y-7 | | | | | | | | 10 | | |
| | Modified hydrogenated product Y-8 | | | | | | | | | 10 | |
| | Modified hydrogenated product Y-9 | | | | | | | | | | 10 |

TABLE 3-continued

| | Test method | Test piece size | Test temperature/ unit | | | | | | | | | |
|---|---|---|---|---|---|---|---|---|---|---|---|---|
| Loss factor 2nd mode (300 Hz) | JIS K7391 | 200 × 10 × 2 mmt | 20° C. | 0.024 | 0.035 | 0.014 | 0.009 | 0.009 | 0.021 | *1 | 0.019 | 0.008 |
| | | | 40° C. | 0.035 | 0.030 | 0.009 | 0.008 | 0.009 | 0.033 | *1 | 0.030 | 0.006 |
| | | | 60° C. | 0.030 | 0.027 | 0.007 | 0.007 | 0.009 | 0.028 | *1 | 0.025 | 0.007 |
| | | | 80° C. | 0.027 | 0.015 | 0.007 | 0.007 | 0.011 | 0.025 | *1 | 0.022 | 0.008 |
| | | | 100° C. | 0.015 | 0.009 | 0.009 | 0.008 | 0.019 | 0.014 | *1 | 0.013 | 0.013 |
| Loss factor 4th mode (1500 Hz) | JIS K7391 | 200 × 10 × 2 mmt | 20° C. | 0.022 | 0.038 | 0.022 | 0.013 | 0.013 | 0.020 | *1 | 0.017 | 0.011 |
| | | | 40° C. | 0.038 | 0.033 | 0.014 | 0.010 | 0.011 | 0.036 | *1 | 0.033 | 0.008 |
| | | | 60° C. | 0.033 | 0.031 | 0.009 | 0.008 | 0.009 | 0.031 | *1 | 0.028 | 0.007 |
| | | | 80° C. | 0.031 | 0.021 | 0.008 | 0.007 | 0.010 | 0.029 | *1 | 0.026 | 0.007 |
| | | | 100° C. | 0.021 | 0.010 | 0.008 | 0.008 | 0.015 | 0.019 | *1 | 0.016 | 0.010 |
| Tensile strength | ISO527-1 | ISO multi-purpose test piece A type | 23° C./MPa | 71 | 71 | 71 | 71 | 75 | 71 | *1 | 62 | 73 |
| Tensile fracture strain | | | 23° C./% | 11.5 | 11.3 | 10.3 | 11.9 | 10.6 | 11.4 | *1 | 4.4 | 11.7 |
| Tensile elastic modulus | | | 23° C./GPa | 2.0 | 2.0 | 2.0 | 2.0 | 2.3 | 2.0 | *1 | 1.9 | 2.1 |
| Bending strength | ISO178 | ISO multi-purpose test piece A type | 23° C./MPa | 96 | 96 | 96 | 92 | 101 | 96 | *1 | 95 | 94 |
| Flexural modulus | | | 23° C./GPa | 2.1 | 2.1 | 2.1 | 2.1 | 2.3 | 2.1 | *1 | 2 | 2.2 |
| Injection-Moldability | — | 110 × 110 × 2 mmt | — | A | A | A | A | A | A | *1 | B | A |

From Table 3, the resin composition of Example can exhibit a good vibration damping property in a wide range of temperatures of 20° C. to 100° C., and also has good evaluation results on the tensile characteristics and the bending characteristics. In addition, since the surface of the injection-molded body is smooth and the moldability is excellent, it can be said that the resin composition of Example is excellent in all of vibration damping, mechanical properties, and moldability. It is thought that this is because the vibration damping property and the thermal stability of the modified hydrogenated product of the present invention are also maintained in the resin composition, and it can be found that the modified hydrogenated product and the resin are well compatible with each other.

Meanwhile, the resin composition in Comparative Example 5 cannot exhibit a sufficient tensile characteristic and a bending characteristic, and is also inferior in the injection-moldability since the modified hydrogenated product not having an excellent thermal stability is used. In addition, in Comparative Example 6, the used modified hydrogenated product is inferior in vibration damping, and as a result, vibration damping is also inferior in the resin composition.

Example 13 and Comparative Example 7

By using the modified hydrogenated products and the following resin according to the formulation noted in Table 4, at a twin-screw extrusion temperature of 250° C., an injection-mold temperature of 250° C., and a mold temperature of 80° C., resin compositions were produced in the same manner as in Example 7.

In regard to the obtained resin compositions, Table 4 illustrates the evaluation results of physical properties (the loss factor and the tensile characteristic).

<Resin>
Polyamide 6
[Product name "UBE nylon (registered trademark) 1013 B," manufactured by UBE Industries, Ltd.]

TABLE 4

| | | | Example 13 | Comparative Example 7 |
|---|---|---|---|---|
| Resin composition | Polyamide 6 | mass % | 90 | 90 |
| | Modified hydrogenated product Y-1 | | 10 | |
| | Modified hydrogenated product Y-9 | | | 10 |

| | Test method | Test piece size | Test temperature/unit | | |
|---|---|---|---|---|---|
| Loss factor 2nd mode (300 Hz) | JIS K7391 | 200 × 10 × 2 mmt | 0° C. | 0.012 | 0.008 |
| | | | 20° C. | 0.015 | 0.010 |
| | | | 40° C. | 0.110 | 0.085 |
| | | | 60° C. | 0.131 | 0.101 |
| | | | 80° C. | 0.120 | 0.093 |
| | | | 100° C. | 0.089 | 0.067 |

TABLE 4-continued

| | | | | | |
|---|---|---|---|---|---|
| Tensile strength | ISO527-1 | ISO multipurpose test piece A type | 23° C./MPa | 56 | 52 |
| Tensile fracture strain | | | 23° C./% | 38 | 42 |
| Tensile elastic modulus | | | 23° C./MPa | 894 | 884 |

From Table 4, the resin composition of Example can exhibit a good vibration damping property in a wide range of temperatures of 0° C. to 100° C., and also has good evaluation results on the tensile characteristics. In addition, the modified hydrogenated product of the present invention is also excellent in thermal stability, and further, it may be thought that the modified hydrogenated product and the resin are well compatible with each other. Therefore, it can be inferred that the resin composition of Example noted in Table 4 is excellent in the bending characteristic and moldability, that is, excellent in all of the vibration damping property, mechanical properties, and moldability.

Examples 14 and 15 and Comparative Example 8

By using the modified hydrogenated products and the following resin according to the formulation noted in Table 5, at a twin-screw extrusion temperature of 250° C., an injection-mold temperature of 250° C., and a mold temperature of 40° C., resin compositions were produced in the same manner as in Example 7.

In regard to the obtained resin compositions, Table 5 illustrates the evaluation results of the physical properties (the loss factor).

<Resin>
Polybutylene Terephthalate
[Product name "TORAYCON (registered trademark) 1401 X31," manufactured by Toray Industries, Inc.]

TABLE 5

| | | | | Example 14 | Example 15 | Comparative Example 8 |
|---|---|---|---|---|---|---|
| Resin composition | Polybutylene terephthalate | mass % | | 90 | 80 | 90 |
| | Modified hydrogenated product Y-1 | | | 10 | 20 | |
| | Modified hydrogenated product Y-9 | | | | | 10 |
| | Test method | Test piece size | Test temperature/unit | | | |
| Loss factor 2nd mode (300 Hz) | JIS K7391 | 200 × 10 × 2 mmt | 0° C. | 0.010 | 0.011 | 0.009 |
| | | | 20° C. | 0.015 | 0.022 | 0.007 |
| | | | 40° C. | 0.060 | 0.097 | 0.007 |
| | | | 60° C. | 0.031 | 0.046 | 0.006 |
| | | | 80° C. | 0.016 | 0.018 | 0.006 |
| | | | 100° C. | 0.008 | 0.007 | 0.005 |

From Table 5, the resin composition of Example can exhibit a good vibration damping property in a wide range of temperatures of 0° C. to 100° C. (particularly 20° C. to 80° C.). In addition, the modified hydrogenated product of the present invention is also excellent in thermal stability, and further, it may be thought that the modified hydrogenated product and the resin are well compatible with each other. Therefore, it can be inferred that the resin composition of Example noted in Table 5 is excellent in the tensile characteristic, the bending characteristic and the moldability, that is, excellent in all of the vibration damping property, mechanical properties, and moldability.

Examples 16 and 17 and Comparative Example 9

By using the modified hydrogenated products and the following resin according to the formulation noted in Table 6, at a twin-screw extrusion temperature of 280° C., an injection-mold temperature of 280° C., and a mold temperature of 70° C., resin compositions were produced in the same manner as in Example 7.

In regard to the obtained resin compositions, Table 6 illustrates the evaluation results of physical properties (the loss factor).

<Resin>
Polycarbonate
[Product name "Iupilon (registered trademark) S3000R", manufactured by Mitsubishi Engineering-Plastics Corporation]

TABLE 6

|  |  |  |  | Example 16 | Example 17 | Comparative Example 9 |
|---|---|---|---|---|---|---|
| Resin composition | Polycarbonate | mass % |  | 90 | 90 | 90 |
|  | Modified hydrogenated product Y-1 |  |  | 10 |  |  |
|  | Modified hydrogenated product Y-3 |  |  |  | 10 |  |
|  | Modified hydrogenated product Y-9 |  |  |  |  | 10 |
|  | Test method | Test piece size | Test temperature/unit |  |  |  |
| Loss factor 2nd mode (300 Hz) | JIS K7391 | 200 × 10 × 2 mmt | 0° C. | 0.015 | 0.042 | 0.012 |
|  |  |  | 20° C. | 0.026 | 0.010 | 0.007 |
|  |  |  | 40° C. | 0.038 | 0.006 | 0.006 |
|  |  |  | 60° C. | 0.008 | 0.005 | 0.006 |
|  |  |  | 80° C. | 0.006 | 0.005 | 0.005 |
|  |  |  | 100° C. | 0.005 | 0.005 | 0.005 |

From Table 6, the resin composition of Example can exhibit a good vibration damping property in a wide range of temperatures of 0° C. to 100° C. (particularly, 0° C. to 40° C. in Example 16, 0° C. in Example 17). In addition, the modified hydrogenated product of the present invention is also excellent in thermal stability, and further, it may be thought that the modified hydrogenated product and the resin are well compatible with each other. Therefore, it can be inferred that the resin composition of Example noted in Table 6 is excellent in the tensile characteristic, the bending characteristic and the moldability, that is, excellent in all of the vibration damping property, mechanical properties, and moldability.

Example 18 and Comparative Example 10

By using the modified hydrogenated products and the following resin according to the formulation noted in Table 7, at a twin-screw extrusion temperature of 320° C., an injection-mold temperature of 320° C., and a mold temperature of 140° C., resin compositions were produced in the same manner as in Example 7.

In regard to the obtained resin compositions, Table 7 illustrates the evaluation results of physical properties (the loss factor, the tensile characteristic and the bending characteristic).

<Resin>

Polyphenylene Sulfide

[Product name "TORELINA (registered trademark) A900," manufactured by Toray Industries, Inc.]

TABLE 7

|  |  |  |  | Example 18 | Comparative Eample 10 |
|---|---|---|---|---|---|
| Resin composition | Polyphenylene sulfide | mass % |  | 90 | 90 |
|  | Modified hydrogenated product Y-1 |  |  | 10 |  |
|  | Modified hydrogenated product Y-9 |  |  |  | 10 |
|  | Test method | Test piece size | Test temperature/unit |  |  |
| Loss factor 2nd mode (300 Hz) | JIS K7391 | 200 × 10 × 2 mmt | 0° C. | 0.015 | 0.009 |
|  |  |  | 20° C. | 0.025 | 0.008 |
|  |  |  | 40° C. | 0.035 | 0.006 |
|  |  |  | 60° C. | 0.030 | 0.007 |
|  |  |  | 80° C. | 0.017 | 0.008 |
|  |  |  | 100° C. | 0.010 | 0.007 |
| Tensile strength | ISO527-1 | ISO multi-purpose test piece A type | 23° C./MPa | 68 | 64.8 |
| Tensile fracture strain |  |  | 23° C./% | 4.2 | 3 |
| Tensile elastic modulus |  |  | 23° C./GPa | 3.1 | 3.4 |
| Bending strength | ISO178 | ISO multi-purpose test piece A type | 23° C./MPa | 93 | 99.3 |
| Flexural modulus |  |  | 23° C./GPa | 2.7 | 2.9 |

From Table 7, the resin composition of Example can exhibit a good vibration damping property in a wide range of temperatures of 0° C. to 100° C. (particularly 0° C. to 80° C.), and also has good evaluation results on the tensile characteristics and the bending characteristics. In addition, the modified hydrogenated product of the present invention is also excellent in thermal stability, and further, it may be thought that the modified hydrogenated product and the resin are well compatible with each other. Therefore, it can be inferred that the resin composition of Example noted in Table 7 is excellent in the moldability, that is, excellent in all of the vibration damping property, mechanical properties, and moldability.

Example 19 and Comparative Example 11

By using the modified hydrogenated products and the following resin according to the formulation noted in Table 8, at a twin-screw extrusion temperature of 200° C., an injection-mold temperature of 200° C., and a mold temperature of 60° C., resin compositions were produced in the same manner as in Example 7.

In regard to the obtained resin compositions, Table 8 illustrates the evaluation results of physical properties (the loss factor).

<Resin>
Polyacetal
[Product name "DURACON (registered trademark) M90-44," manufactured by Polyplastics Co., Ltd.]

TABLE 8

|  |  |  | Example 19 | Comparative Example 11 |
|---|---|---|---|---|
| Resin composition | Polyacetal | mass % | 90 | 90 |
|  | Modified hydrogenated product Y-1 |  | 10 |  |
|  | Modified hydrogenated product Y-9 |  |  | 10 |
|  | Test method | Test piece size | Test temperature/unit |  |
| Loss factor 2nd mode (300 Hz) | JIS K7391 | 200 × 10 × 2 mmt | 0° C. | 0.020 | 0.019 |
|  |  |  | 20° C. | 0.025 | 0.019 |
|  |  |  | 40° C. | 0.104 | 0.021 |
|  |  |  | 60° C. | 0.032 | 0.021 |
|  |  |  | 80° C. | 0.028 | 0.022 |
|  |  |  | 100° C. | 0.030 | 0.026 |

From Table 8, the resin composition of Example can exhibit a good vibration damping property in a wide range of temperatures of 0° C. to 100° C. (particularly, 20° C. to 100° C.). In addition, the modified hydrogenated product of the present invention is also excellent in thermal stability, and further, it may be thought that the modified hydrogenated product and the resin are well compatible with each other. Therefore, it can be inferred that the resin composition of Example noted in Table 8 is excellent in the tensile characteristic, the bending characteristic and the moldability, that is, excellent in all of the vibration damping property, mechanical properties, and moldability.

Examples 20 to 22 and Comparative Example 12

By using the modified hydrogenated products, and the following resin and the additive according to the formulation noted in Table 9, at a twin-screw extrusion temperature of 320° C., an injection-mold temperature of 320° C., and a mold temperature of 140° C., resin compositions were produced in the same manner as in Example 7.

In regard to the obtained resin compositions, Table 9 illustrates the evaluation results of physical properties (the loss factor, the tensile characteristic and the bending characteristic).

<Resin>
Semi-Aromatic Polyamide
[composed of a terephthalic acid unit, and a 1,9-nonane diamine unit and a 2-methyl-1,8-octane diamine unit (1,9-nonane diamine unit:2-methyl-1,8-octane diamine unit=80:20 (molar ratio), melting point: 300° C.]

<Additive>
Glass Fiber
[Product name "T-251H," Nippon Electric Glass Co., Ltd.]

TABLE 9

|  |  |  | Example 20 | Example 21 | Example 22 | Comparative Example 12 |
|---|---|---|---|---|---|---|
| Resin composition | Semi-aromatic polyamide | mass % | 60 | 60 | 60 | 60 |
|  | Modified hydrogenated product Y-1 |  | 10 |  |  |  |

TABLE 9-continued

|  |  |  |  |  |  |  |  |
|---|---|---|---|---|---|---|---|
| Modified hydrogenated product Y-4 |  |  |  | 10 |  |  |  |
| Modified hydrogenated product Y-5 |  |  |  |  | 10 |  |  |
| Modified hydrogenated product Y-9 |  |  |  |  |  | 10 |  |
| Glass fiber |  |  |  | 30 | 30 | 30 | 30 |
|  | Test method | Test piece size | Test temperature/unit |  |  |  |  |
| Loss factor 2nd mode (300 Hz) | JIS K7391 | 200 × 10 × 2 mmt | 20° C. | 0.016 | 0.008 | 0.006 | 0.005 |
|  |  |  | 40° C. | 0.022 | 0.007 | 0.006 | 0.004 |
|  |  |  | 60° C. | 0.011 | 0.007 | 0.006 | 0.004 |
|  |  |  | 80° C. | 0.008 | 0.007 | 0.008 | 0.004 |
| Tensile strength | ISO527-1 | ISO multipurpose test piece A type | 23° C./MPa | 158 | 134 | 164 | 153 |
| Tensile fracture strain |  |  | 23° C./% | 2.7 | 2.5 | 2.6 | 3.2 |
| Tensile elastic modulus |  |  | 23° C./GPa | 8.3 | 7.4 | 8.8 | 7.6 |
| Bending strength | ISO178 | ISO multipurpose test piece A type | 23° C./MPa | 222 | 191 | 232 | 219 |
| Flexural modulus |  |  | 23° C./GPa | 8.1 | 7.7 | 8.8 | 7.7 |

From Table 9, it can be found that since the resin composition of Example contains glass fiber, the tensile characteristic and the bending characteristic are further improved, and eh vibration damping property is maintained without being reduced so much. In particular, the resin composition of Example 20 exhibits a good vibration damping property in a wide range of temperatures of 20° C. to 80° C., and it can be found that both a good vibration damping property and mechanical properties are compatible. In addition, the modified hydrogenated product of the present invention is also excellent in thermal stability, and further, it may be thought that the modified hydrogenated product and the resin are well compatible with each other. Therefore, it can be inferred that the resin composition of Example noted in Table 9 is excellent in moldability, that is, excellent in all of the vibration damping property, mechanical properties, and moldability.

INDUSTRIAL APPLICABILITY

The modified hydrogenated product or the resin composition of the present invention may be suitably used for pellets, bales, damping materials, sound insulating materials, dam rubber, sole materials, flooring materials, an adhesive or a sticking agent, a laminate, molded bodies such as a film and a sheet, various automobile parts, and the like.

The invention claimed is:

1. A modified hydrogenated product of a block copolymer comprising a polymer block (A) comprising a structural unit derived from an aromatic vinyl compound, and a polymer block (B) comprising a structural unit derived from a conjugated diene compound,
   wherein
   the modified hydrogenated product has one or more functional groups selected from the group consisting of a carboxy group and an acid anhydride-derived group,
   a content of the one or more functional groups is 0.1 to 0.95 phr, and satisfies the following conditions (1) and (2):

Condition (1): after a stay at 330° C. for 30 min under nitrogen atmosphere, a weight change rate is from 0% to −5.5, and Condition (2): a peak top intensity of tan δ measured in accordance with JIS K7244-10 (2005), under conditions including a strain amount of 0.1%, a frequency of 11 Hz, a measurement temperature of −70 to 120° C., and a temperature rise rate of 3° C./min, is 1.0 or more.

2. The modified hydrogenated product of claim wherein the conjugated diene compound comprises isoprene.

3. The modified hydrogenated product of claim 1, wherein the conjugated diene compound comprises isoprene and butadiene.

4. The modified hydrogenated product of claim 1, wherein a content of isoprene in the conjugated diene compound is 20% by mass or more.

5. The modified hydrogenated product of claim 1, wherein the aromatic vinyl compound comprises styrene.

6. The modified hydrogenated product of claim 1, wherein a content of the polymer block (A) in the block copolymer is 70% by mass or less.

7. The modified hydrogenated product of claim 1, wherein the polymer block (A) comprises the structural unit derived from the aromatic vinyl compound in an amount of more than 70 mol %.

8. The modified hydrogenated product of claim 1, wherein the polymer block (B) comprises the structural unit derived from the conjugated diene compound in an amount of 30 mol % or more.

9. The modified hydrogenated product of claim 1, wherein an amount of vinyl bonds in the polymer block (B) is 5 mol % or more.

10. The modified hydrogenated product of claim 1, wherein a hydrogenation rate of the polymer block (B) is 78.0 mol % or more.

11. The modified hydrogenated product of claim 1, wherein a number of tertiary carbon atoms is 1.0 or more.

12. The modified hydrogenated product of claim 1, further satisfying the following condition (3):

Condition (3): there is a series of temperature regions where tan δ measured in accordance with JIS K7244-10

(2005) under conditions including a strain amount of 0.1%, a frequency of 1 Hz, a measurement temperature of −70 to 120° C., and a temperature rise rate of 3° C./min, is 0.5 or more, and a maximum width of these temperature regions is 13° C. or more.

13. A method of producing the modified hydrogenated product of claim 1, the method comprising carrying out a polymerization reaction by using at least an aromatic vinyl compound and a conjugated diene compound as monomers to obtain a block copolymer having a polymer block (A) comprising a structural unit derived from the corresponding aromatic vinyl compound, and a polymer block (B) comprising a structural unit derived from the conjugated diene compound.

14. The method of claim 13, further comprising:
hydrogenating the block copolymer to obtain a hydrogenated block copolymer, and
introducing one or more functional groups selected from the group consisting of a carboxy group and an acid anhydride-derived group, into the corresponding hydrogenated block copolymer in a melted state, by using a radical initiator.

15. A resin composition, comprising the modified hydrogenated product of claim 1.

16. A resin composition, comprising the modified hydrogenated product of claim 1 as a component (I) and a thermoplastic resin as a component (II).

17. The resin composition of claim 16, wherein the thermoplastic resin is a polar resin.

18. The resin composition of claim 16, wherein the thermoplastic resin is one or more selected from the group consisting of a polyphenylene ether-based resin, a styrene-based resin, an acrylic resin, a polycarbonate-based resin, a polyamide-based resin, a polyphenylene sulfide-based resin, a polyacetal-based resin, and a polyester-based resin.

19. The resin composition of claim 16, wherein a mass ratio [(I)/(II)] of the component (I) and the component (II) is 1/99 to 99/1.

20. A pellet, comprising the modified hydrogenated product of claim 1 or a resin composition comprising the modified hydrogenated product.

21. A molded body, obtained by molding the modified hydrogenated product of claim 1 or a resin composition comprising the modified hydrogenated product.

22. A damping material, comprising the modified hydrogenated product of claim 1 or a resin composition comprising the modified hydrogenated product.

23. An automobile part, comprising the modified hydrogenated product of claim 1 or a resin composition comprising the modified hydrogenated product.

24. The modified hydrogenated product of claim 1, wherein the polymer block (B) further comprises at least one aliphatic skeleton (X) represented by formula (X), in a main chain:

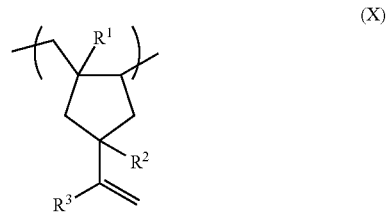

wherein $R^1$ to $R^3$ each independently represents a hydrogen atom or a hydrocarbon group having 1 to 11 carbon atoms, and the plurality of $R^1$ to $R^3$ may be the same or different.

25. The modified hydrogenated product of claim 24, wherein a content of the at least one aliphatic skeleton (X) is 1 mol % or more.

* * * * *